US012363154B1

(12) United States Patent
Roecks et al.

(10) Patent No.: US 12,363,154 B1
(45) Date of Patent: Jul. 15, 2025

(54) GENERATING PLAYBOOK RUN STATISTICS FOR PLAYBOOKS EXECUTED BY AN INFORMATION TECHNOLOGY AND SECURITY OPERATIONS APPLICATION

(71) Applicant: Splunk Inc., San Francisco, CA (US)

(72) Inventors: Jeffrey Roecks, San Carlos, CA (US); Giulio Colleluori, New York, NY (US); Taotao Yu, Fremont, CA (US); Ryan Connor Means, San Jose, CA (US)

(73) Assignee: SPLUNK Inc., San Francisco, CA (US)

( * ) Notice: Subject to any disclaimer, the term of this patent is extended or adjusted under 35 U.S.C. 154(b) by 132 days.

(21) Appl. No.: 17/977,985

(22) Filed: Oct. 31, 2022

(51) Int. Cl.
*G06F 11/34* (2006.01)
*G06F 11/3604* (2025.01)
*H04L 9/40* (2022.01)

(52) U.S. Cl.
CPC ...... *H04L 63/1433* (2013.01); *G06F 11/3409* (2013.01); *G06F 11/3466* (2013.01); *G06F 11/3616* (2013.01); *H04L 63/1425* (2013.01)

(58) Field of Classification Search
CPC .............. G06F 11/0709; G06F 11/079; G06F 11/2023; G06F 11/30–3616;
(Continued)

(56) References Cited

U.S. PATENT DOCUMENTS 5,047,919 A * 9/1991 Sterling ................. G06F 11/348
714/E11.212
5,732,273 A * 3/1998 Srivastava .......... G06F 11/3612
717/130

(Continued)

FOREIGN PATENT DOCUMENTS

WO WO-2021228766 A1 * 11/2021 .......... G06F 11/3652

OTHER PUBLICATIONS

"Cybersecurity Incident & Vulnerability Response Playbooks", Nov. 2021, The Cybersecurity and Infrastructure Security Agency (CISA) , obtained online from <https://www.cisa.gov/sites/default/files/2024-08/Federal_Government_Cybersecurity_Incident_and_Vulnerability_Response_Playbooks_508C.pdf> (Year: 2021).*

(Continued)

*Primary Examiner* — Zhimei Zhu
(74) *Attorney, Agent, or Firm* — Kilpatrick Townsend & Stockton LLP

(57) ABSTRACT

Techniques are described for providing users of an IT and security operations application with the ability to enable the collection and display of playbook run statistics. Users can selectively enable the generation of playbook run statistics for individual playbooks. Once enabled for a playbook, the IT and security operations application automatically adds source code to the playbook or otherwise enables the collection of function block-level statistics during playbook executions. Users can view the statistics collected for a playbook to compare the performance of individual blocks against one another, to compare the performance of individual playbook runs against other playbook runs or against an average of all playbook runs, and so forth. The ability to obtain playbook run statistics enables users to learn how their playbooks are performing and to troubleshoot potential issues, thereby improving the performance of playbooks and the security and operation of the IT environments in which playbooks are deployed.

19 Claims, 10 Drawing Sheets

(58) Field of Classification Search
CPC ........... G06F 2201/88; G06F 2201/865; G06F 2201/86; H04L 63/1433; H04L 63/1425
See application file for complete search history.

(56) References Cited

U.S. PATENT DOCUMENTS

| | | | | |
|---|---|---|---|---|
| 7,406,686 B2* | 7/2008 | Liu | ..................... | G06F 11/3612 717/127 |
| 7,788,644 B2* | 8/2010 | Koduru | ............... | G06F 11/3471 717/124 |
| 7,937,344 B2 | 5/2011 | Baum et al. | | |
| 8,112,425 B2 | 2/2012 | Baum et al. | | |
| 8,161,461 B2* | 4/2012 | Delmonte | ........... | G06F 11/3471 717/127 |
| 8,271,959 B2* | 9/2012 | Krauss | ................ | G06F 11/3419 717/131 |
| 8,495,577 B2* | 7/2013 | Crosby | ............... | G06F 11/3466 717/125 |
| 8,555,259 B2* | 10/2013 | Krauss | ................ | G06F 11/3688 717/133 |
| 8,751,529 B2 | 6/2014 | Zhang et al. | | |
| 8,788,525 B2 | 7/2014 | Neels et al. | | |
| 8,972,787 B2* | 3/2015 | Mahesh | .............. | G06F 11/0706 714/37 |
| 9,215,240 B2 | 12/2015 | Merza et al. | | |
| 9,286,413 B1 | 3/2016 | Coates et al. | | |
| 10,127,258 B2 | 11/2018 | Lamas et al. | | |
| 10,373,218 B1* | 8/2019 | Jenkins | .................. | G06Q 30/06 |
| 10,664,535 B1* | 5/2020 | Hahn | .................. | G06F 16/9535 |
| 10,795,649 B1* | 10/2020 | Drake | ................... | H04L 63/101 |
| 2004/0163079 A1* | 8/2004 | Noy | .................... | G06F 11/3409 700/28 |
| 2008/0040191 A1* | 2/2008 | Chakravarty | .......... | G06Q 10/10 705/7.26 |
| 2012/0222017 A1* | 8/2012 | Hinkle | ................ | G06F 11/3409 717/130 |
| 2017/0063920 A1* | 3/2017 | Thomas | .................... | H04L 9/32 |
| 2019/0098106 A1 | 3/2019 | Mungel et al. | | |
| 2021/0334154 A1* | 10/2021 | Kalamkar | ........... | G06F 11/0775 |

OTHER PUBLICATIONS

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carasso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

| Function Block Resource Usage Record 300 | |
|---|---|
| id | 67 |
| block_name | playbook_100_geolocates_1 |
| http_bytes_in_requests | 0 |
| http_bytes_in_responses | 0 |
| db_numer_queries | 31 |
| enter_time | 9:47:20 |
| leave_time | 9:47:21 |
| status | success |
| playbook_run_id | 12 |
| db_query_latency | 00:00.0 |
| http_latency | 0:00:00 |
| http_num_requests | 0 |
| playbook_id | 1535 |

FIG. 3

SOAR   suspicious_email_o36

Visual Playbook
Editor Interface 400

Playbook Run Statistics                                    Repo: local    Save    Settings

| Playbook Run ▶ Playbook | 500 | Average – last 24 hours ▶ | 502 | Playbook Run ▶ Playbook | 504 |
|---|---|---|---|---|---|
| Playbook info | | | | | |
| Playbook run ID | | N/A | | 3 | |
| Container ID | | N/A | | 1 | |
| Start time | | N/A | | 4/15/2022 8:33:52 | |
| Time / action result size | | | | Time / action result size | |
| on_finish | | 3ms / 0 bytes | | 4ms / 0 bytes | |
| on_start | | 51ms / 0 bytes | | 39ms / 0 bytes | |
| whois_ip_1 | | 43ms / 0 byes | | 35ms / 0 byes | |
| Failed blocks | | | | | |
| Total count | | 0 | | 0 | |
| Time executing queries | | 21ms | | 21ms | |
| Total time | | 97ms | | 78ms | |
| Longest running block | | on_start | | on_start | |

EXECUTING, BY AN INFORMATION TECHNOLOGY (IT) AND SECURITY OPERATIONS APPLICATION, A PLAYBOOK INCLUDING A PLURALITY OF FUNCTION BLOCKS, WHEREIN THE PLURALITY OF FUNCTION BLOCKS COLLECTIVELY DEFINES A SERIES OF OPERATIONS TO BE PERFORMED RESPONSIVE TO IDENTIFICATION OF AN INCIDENT IN AN IT ENVIRONMENT, AND WHEREIN EACH FUNCTION BLOCK OF THE PLURALITY OF FUNCTION BLOCKS INCLUDES COMPUTER PROGRAM SOURCE CODE THAT IS EXECUTED UPON ENCOUNTERING THE FUNCTION BLOCK DURING EXECUTION OF THE PLAYBOOK
702

MONITORING, BY THE IT AND SECURITY OPERATIONS APPLICATION, EXECUTION OF EACH OF THE PLURALITY OF FUNCTION BLOCKS TO OBTAIN A PLURALITY OF PLAYBOOK RUN STATISTICS FOR THE PLAYBOOK
704

CAUSING DISPLAY OF A REPORT INDICATING THE PLURALITY OF PLAYBOOK RUN STATISTICS
706

GENERATING PLAYBOOK RUN STATISTICS FOR PLAYBOOKS EXECUTED BY AN INFORMATION TECHNOLOGY AND SECURITY OPERATIONS APPLICATION

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Monitoring the operation and security of even a moderately complex computing environment typically involves a large number of tasks including, for example, investigating alerts generated by various operational and security monitoring applications, performing tasks to detect, triage, and respond to identified threats, and the like. To aid users and organizations with these and other tasks, some data intake and query systems provide users with a range of information technology (IT) and security-related applications (such as, e.g., security intelligence management services, Security Orchestration, Automation, and Response (SOAR) applications enterprise security applications, etc.). These applications broadly enable users to automatically monitor, detect, and investigate IT and security-related incidents, to automate repetitive tasks, and to strengthen defenses by connecting and coordinating complex workflows across security analyst teams and tools.

BRIEF DESCRIPTION OF THE DRAWINGS

Illustrative examples are described in detail below with reference to the following figures:

FIG. 3 illustrates an example function block resource usage record according to some examples.

FIG. 5 is a block diagram of a visual playbook editor GUI displaying playbook run statistics according to some examples.

FIG. 7 is a flow diagram illustrating operations of a method in which an IT and security operations application provides playbook run statistics an according to some examples.

DETAILED DESCRIPTION

Figure 1:
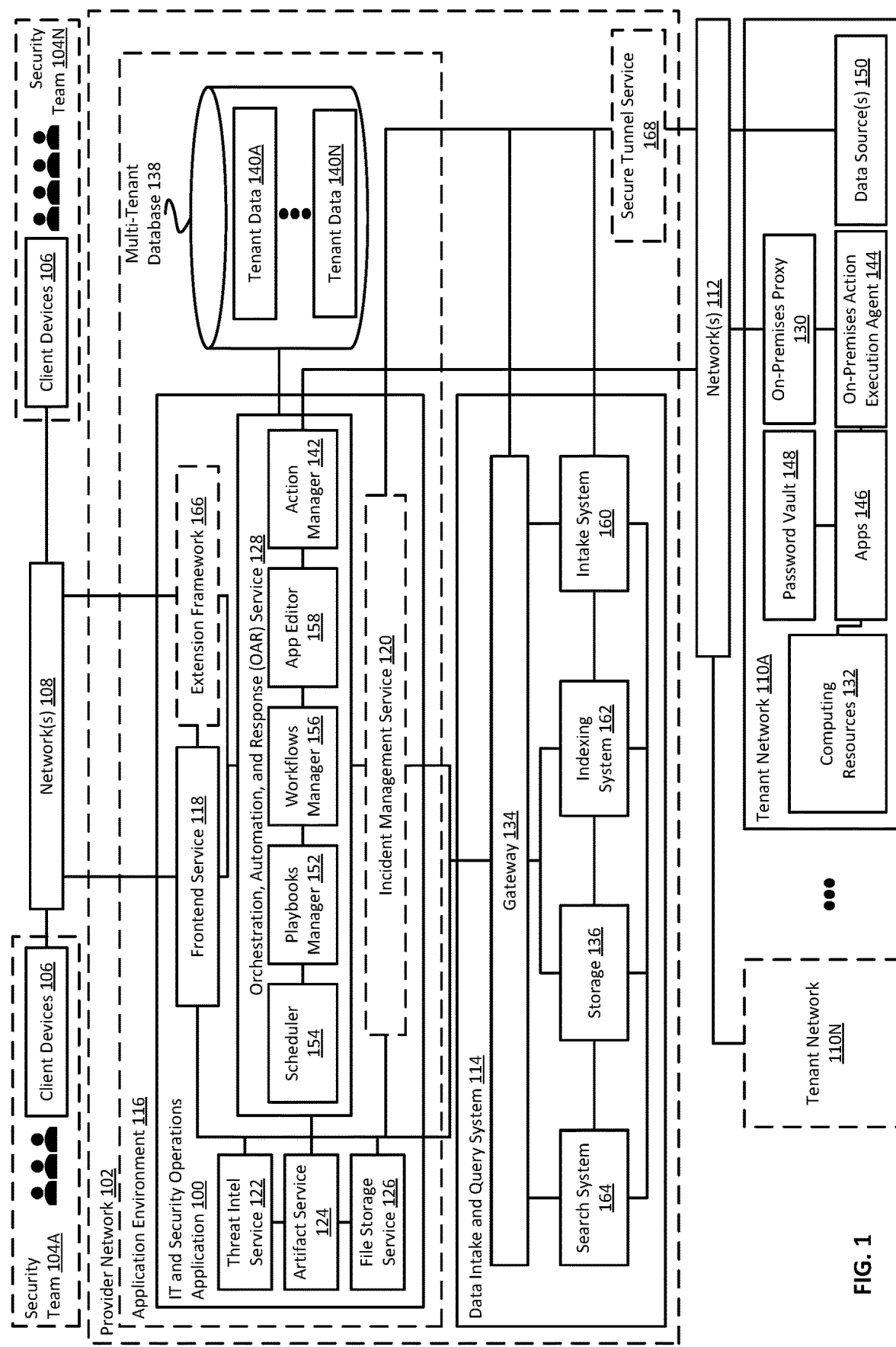
FIG. 1 is a block diagram of an example computing environment in which an IT and security operations application provides playbook run statistics according to some examples.

The present disclosure relates to methods, apparatus, systems, and non-transitory computer-readable storage media for a framework that enables users to obtain statistics associated with the execution of users' playbooks by an IT and security operations application. Users of an IT and security operations application can create and execute playbooks to automate security and IT workflows, thereby improving the efficiency with which security teams can implement responses to incidents in IT environments. A user can define a playbook, for example, by linking together a series of actions that are provided by "apps" (software integrated with the IT and security operations application and used to interact with a device or service that is external to the IT and security operations application). The actions of a playbook are each implemented by computer program code executed by the IT and operations application responsive to the identification of an incident or by manual invocation by a user.

Today, users have limited visibility into performance statistics associated with the execution of playbooks by an IT and security operations application and, as a result, lack the ability to readily diagnose certain types of runtime performance issues and other playbook inefficiencies. For example, while users have numerous ways to see the output or results generated by playbook executions, limited information is generally available detailing the performance of individual function blocks such as, for example, how many times each function block of a playbook is called during execution, an amount of data transferred by a function block via Hypertext Transfer Protocol (HTTP) requests and responses (e.g., as part of the function block's interactions with computing devices or services external to the IT and security operations application), a count of and an amount of data transferred by database calls performed by each function block, and the like.

To address these challenges, among others, an IT and security operations application provides users with the ability to enable the collection and display of playbook run statistics. According to examples described herein, users can selectively enable the generation of playbook run statistics for individual playbooks. Once enabled for a playbook, the IT and security operations application automatically adds source code to the playbook or otherwise enables the collection of function block-level statistics during playbook executions (or playbook "runs"). Users can view the statistics collected for a playbook to compare the performance of individual blocks against one another, to compare the performance of individual playbook runs against other playbook runs or against an average of all playbook runs, and the like. The ability to obtain playbook run statistics enables users to learn how their playbooks are performing and to troubleshoot potential issues, thereby improving the performance of playbooks and the security and operation of the IT environments in which the playbooks are deployed.

FIG. 1 is a block diagram of an example computing environment in which an IT and security operations application collects and provides access to playbook run statistics according to some examples. As shown in FIG. 1, an IT and security operations application 100 comprises software components executed by one or more electronic computing devices. In some examples, the computing devices are provided by a cloud provider network 102 (e.g., as part of a shared computing resource environment) while, in other examples, an IT and security operations application 100 executes on computing devices managed within an on-premises datacenter or other computing environment, or on computing devices located within a combination of cloud-based and on-premises computing environments.

The IT and security operations application 100 broadly enables users to perform security orchestration, automation, and response operations involving components of an organization's computing infrastructure (or components of multiple organizations' computing infrastructures). Among other benefits, an IT and security operations application 100 enables security teams and other users to automate repetitive tasks, to efficiently respond to security incidents and other operational issues, and to coordinate complex workflows across security teams and diverse IT environments. For example, users associated with various IT operations or security teams (sometimes referred to as "analysts," where such analysts may be part of a security team 104A, . . . , security team 104N) can use client computing devices 106 to interact with the IT and security operations application 100 via one or more network(s) 108 to perform operations relative to IT environments for which they are responsible (such as, for example, one or more of tenant network 1 10A, . . . , tenant network 110N, which may be accessible over one or more intermediate network(s) 112, where network(s) 112 may be the same or different from network(s) 108). Although only two security teams are depicted in the example of FIG. 1, in general, any number of separate security teams can concurrently use an IT and security operations application 100 to manage any number of tenant networks, where each individual security team may be responsible for one or more tenant networks.

Users can interact with an IT and security operations application 100 and a data intake and query system 114 using client devices 106. The client devices 106 can communicate with the IT and security operations application 100 and with data intake and query system 114 in a variety of ways such as, for example, over an internet protocol via a web browser or other application, via a command line interface, via a software developer kit (SDK), and the like. In some examples, the client devices 106 can use one or more executable applications or programs from an application environment 116 to interface with the data intake and query system 114, such as the IT and security operations application 100. The application environment 116 can include, for example, tools, software modules (e.g., computer executable instructions to perform a particular function), etc., that enable application developers to create computer executable applications to interface with an IT and security operations application 100 and/or data intake and query system 114. The IT and security operations application 100, for example, can use aspects of the application environment 116 to interface with the data intake and query system 114 to obtain relevant data, process the data, and display it in a manner relevant to the IT operations and security context. As shown, the IT and security operations application 100 further includes additional backend services, middleware logic, front-end user interfaces, data stores, and other computing resources, and provides other facilities for ingesting use case specific data and interacting with that data, as described elsewhere herein.

As an example of using the application environment 116, the IT and security operations application 100 includes custom web-based interfaces (e.g., provided at least in part by a frontend service 118) that optionally rely on one or more user interface components and frameworks provided by the application environment 116. In some examples, an IT and security operations application 100 includes, for example, a "mission control" interface or set of interfaces. In this context, a mission control interface refers to any type of interface or set of interfaces that broadly enable users to obtain information about their IT environments, to configure automated actions, playbooks, etc., and to perform operations related to IT and security infrastructure management. The IT and security operations application 100 further includes middleware business logic (including, for example, an optional incident management service 120, a threat intelligence service 122, an artifact service 124, a file storage service 126, and an orchestration, automation, and response (OAR) service 128) implemented on a middleware platform of developers' choice. Furthermore, in some examples, an IT and security operations application 100 can be instantiated and executed in a different isolated execution environment relative to the data intake and query system 114. As a non-limiting example, in cases where the data intake and query system 114 is implemented at least in part in a Kubernetes cluster, the IT and security operations application 100 can execute in a different Kubernetes cluster (or other isolated execution environment system) and interact with the data intake and query system 114 via the gateway 134.

In examples where an IT and security operations application 100 is deployed in a tenant network, the application can instead be deployed as a virtual appliance at one or more computing devices managed by an organization using the IT and security operations application 100. A virtual appliance, for example, can include a VM image file that is pre-configured to run on a hypervisor or directly on the hardware of a computing device and that includes a pre-configured operating system upon which the IT and security operations application 100 executes. In other examples, the IT and security operations application 100 can be provided and installed using other types of standalone software installation packages or software package management systems. Depending on the implementation and user preference, an IT and security operations application 100 optionally can be configured on a standalone server or in a clustered configuration across multiple separate computing devices.

A user can initially configure an IT and security operations application 100 using a web-based console or other interface provided by the IT and security operations application 100 (for example, as provided by a frontend service 118 of the IT and security operations application 100). For example, users can use a web browser or other application to navigate to the IP address or hostname associated with the IT and security operations application 100 to access console interfaces, dashboards, and other interfaces used to interact with various aspects of the application. The initial configuration can include creating and configuring user accounts, configuring connection settings to one or more tenant networks (for example, including settings associated with one or more on-premises proxies 130 used to establish connections between on-premises networks and the IT and security operations application 100 running in a provider network 102 or elsewhere), and performing other optional configurations.

A user (also referred to herein as a "customer," "tenant," or "analyst") of an IT and security operations application 100 can create one or more user accounts to be used by a security team or other users associated with the user. A user of the IT and security operations application 100, for example, typically desires to use the application to manage one or more tenant networks for which the user is responsible (illustrated by example tenant networks 110A, . . . , 110N in FIG. 1). A tenant network can include any number of computing resources 132 operating as part of a corporate network or other networked computing environment with which a user is associated. Although the tenant networks 110A, . . . , 110N are shown as separate from the provider network 102 in FIG. 1, more generally, a tenant network can include components hosted in an on-premises network, in a provider network 102, or combinations of both (for example, as a hybrid cloud network).

In general, any of the computing resources 132 in a tenant network can potentially serve as a source of incident data to an IT and security operations application 100, a computing resource against which actions can be performed by the IT and security operations application 100, or both. The computing resources 132 can include various types of computing devices, software applications, and services including, but not limited to, a data intake and query system 114 (which itself can ingest and process machine data generated by other computing resources 132), a security information and event management (SIEM) system, a representational state transfer (REST) client that obtains or generates incident data based on the activity of other computing resources 132, software applications (including operating systems, databases, web servers, etc.), routers, intrusion detection systems and intrusion prevention systems (IDS/IDP), client devices (for example, servers, desktop computers, laptops, tablets, etc.), firewalls, and switches. The computing resources 132 can execute upon any number separate computing devices and systems within a tenant network.

During operation, data intake and query systems, SIEM systems, REST clients, and other system components of a tenant network obtain operational, performance, and security data from computing resources 132 in the network, analyze the data, and may identify potential IT and security-related incidents from time to time. A data intake and query system in a tenant network, for example, might identify potential IT-related incidents based on the execution of correlation searches against data ingested and indexed by the system, as described elsewhere herein. Other data sources 150 can obtain incident and security-related data using other processes. Once obtained, data indicating such incidents is sent to the data intake and query system 114 or IT and security operations application 100 via an on-premises proxy 130. For example, once a data intake and query system identifies a possible security threat or other IT-related incident based on data ingested by the data intake and query system, data representing the incident can be sent to the data intake and query system 114 via a REST application programming interface (API) endpoint implemented by a gateway 134 or a similar gateway of the IT and security operations application 100. As mentioned elsewhere herein, a data intake and query system 114 or IT and security operations application 100 can ingest, index, and store data received from each tenant network in association with a corresponding tenant identifier such that each tenant's data is segregated from other tenant data (for example, when stored in common storage 136 of the data intake and query system 114 or in a multi-tenant database 138 of the IT and security operations application 100).

As mentioned, in some examples, some or all of the data ingested and created by an IT and security operations application 100 in association with a particular tenant is generally maintained separately from other tenants (for example, as illustrated by tenant data 140A, . . . , tenant data 140N in the multi-tenant database 138). In some examples, a tenant may further desire to keep data associated with two or more separate tenant networks segregated from one another. For example, a security team associated with a managed security service provider (MSSP) may be responsible for managing any number of separate tenant networks for various customers of the MSSP. As another example, a tenant corresponding to a business organization having large, separate departments or divisions may desire to logically isolate the data associated with each division. In such instances, a tenant can configure separate "departments" in the IT and security operations application 100, where each department is associated with a respective tenant network or other defined collection of data sources, computing resources, and so forth. Users and user teams can thus use this feature to manage multiple third-party entities or organizations using only a single login and permissions configuration for the IT and security operations application 100.

Once an IT and security operations application 100 obtains incident data, either directly from a tenant network or indirectly via a data intake and query system 114, the IT and security operations application 100 analyzes the incident data and enables users to investigate, determine possible remediation actions, and perform other operations. These actions can include default actions initiated and performed within a tenant network without direct interaction from user and can further include suggested actions provided to users associated with the relevant tenant networks. Once the suggested actions are determined, these actions can be presented in a "mission control" dashboard or other interface accessible to users of the IT and security operations application 100. Based on the suggested actions, a user can select one or more particular actions to be performed and the IT and security operations application 100 can carry out the selected actions within the corresponding tenant network. In the example of FIG. 1, an OAR service 128 of the IT and security operations application 100, which includes an action manager 142, can cause actions to be performed in a tenant network by sending action requests via network 112 to an on-premises proxy 130, which further interfaces with an on-premises action execution agent (for example, on-premises action execution agent 144 in tenant network 110A). In this example, the on-premises action execution agent 144 is implemented to receive action requests from an action manager 142 and to carry out requested actions against computing resources 132 using apps 146 (sometimes alternatively referred to as "connectors") and optionally a password vault 148 (e.g., to authenticate an app to one or more computing resources 132).

To execute actions against computing resources in tenant networks and elsewhere, in some examples, an IT and security operations application 100 uses a unified security language that includes commands usable across a variety of hardware and software products, applications, and services. To execute a command specified using the unified security language, in some examples, the IT and security operations application 100 (possibly via an on-premises action execution agent 144) uses one or more apps 146 to translate the commands into the one or more processes, languages, scripts, etc., necessary to implement the action at one or more particular computing resources 132. For example, a user might provide input requesting the IT and security operations application 100 to remove an identified malicious process from multiple computing systems in the tenant network 110A, where two or more of the computing systems are associated with different software configurations (for example, different operating systems or operating system versions). Accordingly, in some examples, the IT and security operations application 100 can send an action request to an on-premises action execution agent 144, which then uses one or more apps 146 to translate the command into the necessary processes to remove each instance of the malicious process on the varying computing systems within the tenant network (including the possible use of credentials and other information stored in the password vault 148).

In some examples, an IT and security operations application 100 includes a playbooks manager 152 that enables users to automate actions or series of actions by creating digital "playbooks" that can be executed by the IT and security operations application 100. At a high level, a playbook represents a customizable computer program that can be executed by an IT and security operations application 100 to automate a wide variety of possible operations related to an IT environment. These operations—such as quarantining devices, modifying firewall settings, restarting servers, and so forth—are typically performed by various security products by abstracting product capabilities using an integrated "app model." Additional details related to operation of the IT and security operations application 100 and use of digital playbooks are provided elsewhere herein.

In some examples, an IT and security operations application 100 can support both automation playbooks and input playbooks. An automation playbook can be created and used, for example, to run automatically based on triggers. In some examples, an input playbook accepts configured inputs to run, provides configured outputs, and can be used as a sub-playbook of another automation or input playbook. In other examples, any type of playbook can be used as an automation playbook or input playbook (e.g., an IT and security operations application 100 need not make a distinction between the two).

As mentioned, an IT and security operations application 100 may be implemented as a collection of interworking services that each carry out various functionality as described herein. In the example shown in FIG. 1, the IT and security operations application 100 includes an incident management service 120, a frontend service 118, an artifact service 124, a threat intelligence service 122, a file storage service 126, and an orchestration, automation, and response (OAR) service 128. The set of services comprising the IT and security operations application 100 in FIG. 1 are provided for illustrative purposes only; in other examples, an IT and security operations application 100 can be comprised of more or fewer services and each service may implement the functionality of one or more of the services shown.

In some examples, an incident management service 120 is responsible for obtaining incidents or events (sometimes also referred to as "notables"), either directly from various data sources 150 in tenant networks or directly based on data ingested by the data intake and query system 114 via the gateway 134. The frontend service 118 provides user interfaces to users of the application, among other processes described herein. Using these user interfaces, users of the IT and security operations application 100 can perform various application-related operations, view displays of incident-related information, and can configure administrative settings, license management, content management settings, and so forth. In some examples, an artifact service 124 manages artifacts associated with incidents received by the application, where incident artifacts can include information such as IP addresses, usernames, file hashes, and so forth. In some examples, a threat intelligence service 122 obtains data from external or internal sources to enable other services to perform various incident data enrichment operations. As one non-limiting example, if an incident is associated with a file hash, a threat intelligence service 122 can be used to correlate the file hash with external threat feeds to determine whether the file hash has been previously identified as malicious. In some examples, a file storage service 126 enables other services to store incident-related files, such as email attachments, files, and so forth. In some examples, an OAR service 128 performs a wide range of OAR capabilities such as action execution (via an action manager 142), playbook execution (via a playbooks manager 152), scheduling work to be performed (via a scheduler 154), user approvals and so forth as workflows (via a workflows manager 156), among other functionality described herein. According to examples described herein, an OAR service 128 includes an app editor 158 that enables users to create, modify, and test apps (e.g., including apps 146 utilized within a local tenant network, apps used by an IT and security operations application 100 running in a provider network 102, or used elsewhere) using the built-in app editor, as described in more detail herein.

The operation of an IT and security operations application 100 generally begins with the ingestion of data related to various types of incidents involving computing resources of various tenant networks (for example, computing resources 132 or other data sources 150 of a tenant network 110A). In some examples, users configure an IT and security operations application 100 to obtain, or "ingest," data from one or more defined data sources 150, where such data sources can be any type of computing device, application, or service that supplies information that users may want to store or act upon, and where such data sources may include one or more of the computing resources 132 or data sources which generate data based on the activity of one or more computing resources 132. As mentioned, examples of data sources include, but are not limited to, a data intake and query system such as the SPLUNK® ENTERPRISE system, a SIEM system, a REST client, applications, routers, intrusion detection systems (IDS)/intrusion prevention systems (IDP) systems, client devices, firewalls, switches, or any other source of data identifying potential incidents in tenants' IT environments. Some of these data sources may themselves collect and process data from various other data generating components such as, for example, web servers, application servers, databases, firewalls, routers, operating systems, and software applications that execute on computer systems, mobile devices, sensors, Internet of Things (IoT) devices, etc. The data generated by the various data sources can be represented in any of a variety of data formats.

In some examples, data can be sent from tenant networks to an IT and security operations application 100 using any of several different mechanisms. As one example, data can be sent to data intake and query system 114, processed by an intake system 160 (e.g., including indexing of resulting event data by an indexing system 162, thereby further causing the event data to be accessible to a search system 164), and obtained by an incident management service 120 of the IT and security operations application 100 via a gateway 134. As another example, components can send data from a tenant network directly to the incident management service 120, for example, via a REST endpoint.

In some examples, data ingested by an IT and security operations application 100 from configured data sources 150 can be represented in the IT and security operations application 100 by data structures referred to as "incidents," "events," "notables," or "containers". Here, an incident or event is a structured data representation of data ingested from a data source and that can be used throughout the IT and security operations application 100. In some examples, an IT and security operations application 100 can be configured to create and recognize different types of incidents depending on the corresponding type of data ingested, such as "IT incidents" for IT operations-related incidents, "security incidents" for security-related incidents, and so forth. An incident can further include any number of associated events and "artifacts," where each event or artifact represents an item of data associated with the incident. As a non-limiting example, an incident used to represent data ingested from an anti-virus service and representing a security-related incident might include an event indicating the occurrence of the incident and associated artifacts indicating a name of the virus, a hash value of a file associated with the virus, a file path on the infected endpoint, and so forth.

An incident of an IT and security operations application 100 can be associated with a status or state that may change over time. Analysts and other users can use this status information, for example, to indicate to other analysts which incidents an analyst is actively investigating, which incidents have been closed or resolved, which incidents are awaiting input or action, and the like. Furthermore, an IT and security operations application 100 can use the transitions of incidents from one status to another to generate various metrics related to analyst efficiency and other measurements of analyst teams. For example, the IT and security operations application 100 can be configured with a number of default statuses, such as "new" or "unknown" to indicate incidents that have not yet been analyzed, "in progress" for incidents that have been assigned to an analyst and are under investigation, "pending" for incidents that are waiting input or action from an analyst, and "resolved" for incidents that have been addressed by an assigned analyst. An amount of time that elapses between these statuses for a given incident can be used to calculate various measures of analyst and analyst team efficiency, such as measurements of a mean time to resolve incidents, a mean time to respond to incidents, a mean time to detect an incident that is a "true positive," a mean dwell time reflecting an amount of time taken to identify and remove threats from an IT environment, among other possible measures. Analyst teams can also create custom statuses to indicate incident states that may be more specific to the way the particular analyst team operates, and further create custom efficiency measurements based on such custom statuses.

In some examples, an IT and security operations application 100 also generates and stores data related to its operation and activity conducted by tenant users including, for example, playbook data, workbook data, user account settings, configuration data, and historical data (such as, for example, data indicating actions taken by users relative to particular incidents or artifacts, data indicating responses from computing resources based on action executions, and so forth), in one or more multi-tenant databases 138. In other examples, some or all the data above is stored in storage managed by the data intake and query system 114 and accessed via the gateway 134. These multi-tenant database(s) 138 can operate on a same computer system as the IT and security operations application 100 or at one or more separate database instances. As mentioned, in some examples, the storage of such data by the data intake and query system 114 and IT and security operations application 100 for each tenant is generally segregated from data associated with other tenants based on tenant identifiers stored with the data or other access control mechanisms.

An IT and security operations application 100 can define and implement many different types of "actions," which represent high-level, vendor- and product-agnostic primitives that can be used throughout the IT and security operations application 100. Actions generally represent simple and user-friendly verbs that are used to execute actions in playbooks or manually through other user interfaces of the IT and security operations application 100, where such actions can be performed against one or more computing resources in an IT environment. In many cases, a same action defined by the IT and security operations application 100 can be carried out on computing resources associated with different vendors or configurations via action translation processes performed by apps of the platform, as described in more detail elsewhere herein. Examples of actions that can be defined by an IT and security operations application 100 include a "get process dump" action, a "block IP address" action, a "suspend VM" action, a "terminate process" action, and so forth.

In some examples, an IT and security operations application 100 enables connectivity with various IT computing resources in a provider network 102 and in tenant networks 110A, . . . , 110N, including IT computing resources from a wide variety of third-party IT and security technologies, and further enables the ability to execute actions against those computing resources via apps (such as the apps 146 in tenant network 110A and apps implemented as part of the IT and security operations application 100). In general, an app 146 represents program code that provides an abstraction layer (for example, via one or more libraries, APIs, or other interfaces) to one or more of hundreds of possible IT and security-related products and services and which exposes lists of actions supported by those products and services. Each app 146 can also define which types of computing resources that the app can operate on, an entity that created the app, among other information.

As one example, an IT and security operations application 100 can be configured with an app 146 that enables the application 100 to communicate with a VM product provided by a third-party vendor. In this example, the app for the VM product enables the IT and security operations application 100 to take actions relative to VM instances within a user's IT environment, including starting and stopping the VMs, taking VM snapshots, analyzing snapshots, and so forth. To enable the app 146 to communicate with a VM manager or with individual VM instances, the app 146 can be configured with login credentials, hostnames or IP addresses, and so forth, for each instance with which communication is desired (or the app may be configured to obtain such information from a password vault 148). Other apps 146 can be created and made available for VM products from other third-party vendors, where those apps may be configured to translate some or all the same actions that are available with respect to the first type of VM product. In general, apps 146 enable interaction with virtually any type of computing resource 132 in an IT environment and can be added and updated over time to support new types of computing resources. Additional details related to the creation and modification of apps is described elsewhere herein.

In some examples, computing resources 132 can include physical or virtual components within an organization with which an IT and security operations application 100 communicates (for example, via apps as described above). Examples of computing resources 132 include, but are not limited to, servers, endpoint devices, applications, services, routers, and firewalls. A computing resource 132 can be represented in an IT and security operations application 100 by data identifying the computing resource, including information used to communicate with the device or service such as, for example, an IP address, automation service account, username, password, etc. In some examples, one or more computing resources 132 can be configured as a source of incident information that is ingested by an IT and security operations application 100. The types of computing resources 132 that can be configured in the IT and security operations application 100 may be determined in some cases based on which apps 146 are installed for a particular user. In some examples, automated actions can be configured with respect to various computing resources 132 using playbooks, described in more detail elsewhere herein. Each computing resource 132 may be hosted in an on-premises tenant network, a cloud-based provider network, or any other network or combination thereof.

The operation of an IT and security operations application 100 can include the ability to create and execute customizable playbooks. At a high level, a playbook comprises computer program code and possibly other data that can be executed by an IT and security operations application 100 to carry out an automated set of actions (for example, as managed by a playbooks manager 152 as part of the OAR service 128). In some examples, a playbook is comprised of one or more functions, or codeblocks or function blocks, where each function contains program code that performs defined functionality when the function is encountered during execution of the playbook of which it is a part. As an example, a first function block of a playbook might implement an action that upon execution affects one or more computing resources 132 (e.g., by configuring a network setting, restarting a server, etc.); another function block might filter data generated by the first function block in some manner; yet another function block might obtain information from an external service, and so forth. A playbook is further associated with a control flow that defines an order in which the IT and security operations application 100 executes the function blocks of the playbook, where a control flow may vary at each execution of a playbook depending on particular input conditions (e.g., where the input conditions may derive from attributes associated with an incident triggering execution of the playbook or based on other accessible values).

In some examples, the IT and security operations application 100 described herein provides a visual playbook editor (for example, as an interface provided by a frontend service 118) that allows users to visually create and modify playbooks. Using a visual playbook editor GUI, for example, users can codify a playbook by creating and manipulating a displayed graph including nodes and edges, where each of the nodes in the graph represents one or more function blocks that each perform one or more defined operations during execution of the playbook, and where the edges represent a control flow among the playbook's function blocks. In this manner, users can craft playbooks that perform complex sequences of operations without having to write some or any of the underlying code. The visual playbook editor interfaces further enable users to supplement or modify the automatically generated code by editing the code associated with a visually designed playbook, as desired.

An IT and security operations application 100 can provide one or more playbook management interfaces that enable users to locate and organize playbooks associated with a user's account. A playbook management interface can display a list of playbooks that are associated with a user's account and further provide information about each playbook such as, for example, a name of the playbook, a description of the playbook's operation, a number of times the playbook has been executed, a last time the playbook was executed, a last time the playbook was updated, tags or labels associated with the playbook, a repository at which the playbook and the associated program code is stored, a status of the playbook, and the like.

Users can create a new digital playbook starting from a playbook management interface or using another interface provided by the IT and security operations application 100. Using a playbook management interface, for example, a user can select a "create new playbook" interface element and the IT and security operations application 100 causes display of a visual playbook editor interface including a graphical canvas on which users can add nodes representing operations to be performed during execution of the playbook, where the operations are implemented by associated source code that can be automatically generated by the visual playbook editor, and add connections or edges among the nodes defining an order in which the represented operations are to be performed upon execution.

In some examples, the creation of a graph representing a playbook includes the creation of connections between function blocks, where the connections are represented by edges that visually connect the nodes of the graph representing the collection of function blocks. These connections among the playbook function blocks indicate a program flow for the playbook, defining an order in which the operations specified by the playbook blocks are to occur. For example, if a user creates a connection that links the output of a block A to the input of a block B, then block A executes to completion before execution of block B begins during execution of the playbook. In this manner, output variables generated by the execution of block A can be used by block B (and any other subsequently executed blocks) during playbook execution.

Once a user has codified a playbook using a visual playbook editor or other interface, the playbook can be saved (for example, in a multi-tenant database 138 and in association with one or more user accounts) and run by the IT and security operations application 100 on-demand. As illustrated in the example playbooks above, a playbook includes a "start" block that is associated with source code that begins execution of the playbook. More particularly, the IT and security operations application 100 executes the function represented by the start block for a playbook with container context comprising data about the incident against which the playbook is executed, where the container context may be derived from input data from one or more configured data sources. A playbook can be executed manually in response to a user providing input requesting execution of the playbook, or playbooks can be executed automatically in response to the IT and security operations application 100 obtaining input events matching certain criteria. In examples where the source code associated with a playbook is based on an interpreted programming language (for example, such as the Python programming language), the IT and security operations application 100 can execute the source code represented by the playbook using an interpreter and without compiling the source code into compiled code. In other examples, the source code associated with a playbook can first be compiled into byte code or machine code the execution of which can be invoked by the IT and security operations application 100.

In some examples, an optional IT and security operations application extension framework 166 allows users to extend the user interfaces, data content, and functionality of an IT and security operations application 100 in various ways to enhance and enrich users' workflow and investigative experiences. Example types of extensions enabled by the extension framework 166 include modifying or supplementing GUI elements (including, e.g., tabs, menu items, tables, dashboards, visualizations, etc.) and other components (including, e.g., response templates, connectors, playbooks, etc.), where users can implement these extensions at predefined extension points of the IT and security operations application 100. In some examples, the extension framework 166 further includes a data integration system that provides users with mechanisms to integrate data from external applications, services, or other data sources into their plugins (e.g., to visualize data from any external data source in the IT and security operations application 100 or to otherwise enhance users' investigative experience with data originating outside of the IT and security operations application or data intake and query system 114).

The types of users that might be interested in creating plugins using an IT and security operations application extension framework 166 include, for example, development teams associated with a data intake and query system 114, developers of third-party applications or services relevant to the IT and security operations application 100 (e.g., developers of VM management software, cloud computing resource management software, etc.), and other general users of the IT and security operations application 100. Users of the IT and security operations application 100 might, for example, desire to enhance their own workflows and other processes by enabling internal user information lookups, creating internal ticketing system postings, or enabling any other desired visualizations or actions at various points in the IT and security operations application. In some examples, the extension framework 166 enables users to create plugins using "No-Code" development tools, e.g., where users can define the specifications for custom visualizations, data integrations, and other plugin components without direct user coding (e.g., without the direct creation of JavaScript code, JSON specifications, or other data comprising a plugin), although users can also modify the underlying plugin components as desired.

As one example use case for a plugin, consider a cybersecurity company that provides security software that is known to be used by users of the IT and security operations application 100. In this example, developers of the security software might desire for certain information collected or generated by the security software to be visible at various points within the IT and security operations application 100, e.g., to create a tighter integration of the two software applications. The developers, for example, might desire for users of the IT and security operations application 100 to be able to view endpoint information, malware information, etc., collected by the security application when users view various visualizations or other incident information in the IT and security operations application 100 that is associated with the data collected by the security software.

In the example above, developers associated with the cybersecurity company can use the extension framework 166 to create a plugin that integrates the data collected by the security application with the IT and security operations application 100. Users who subscribe to the plugin can then view relevant data or perform other actions when the users navigate to defined extension points of the IT and security operations application 100. Numerous other such use cases exist for a wide variety of applications, data sources, and desired functionality related to an IT and security operations application 100. Among other benefits, the ability to create and use plugins to an IT and security operations application 100 enables security teams to efficiently investigate and remediate a wide variety of incidents that occur from time to time in IT environments, thereby improving the overall security and operation of the IT environments.

In some examples, components external to the IT and security operations application 100 interface with an intermediary secure tunnel service 168 to send communications to, and to receive communications from, an IT and security operations application 100 running in a provider network 102. In some examples, the secure tunnel service 168 operates as a service that establishes WebSocket or other types of secure connections to endpoint devices. As one example, the secure tunnel service 168 can establish a first secure connection to the IT and security operations application 100 and a second secure connection to an on-premises proxy 130 and an on-premises action execution agent 144 executing in a tenant network 110A, where each connection is established using a handshake technique with the respective endpoints. Once established, the connection enables two-way communications between the IT and security operations application 100 (e.g., via a separate proxy implemented by the IT and security operations application 100) and the on-premises action execution agent 144 without the need to open a port in a firewall or perform other configurations to a network associated with the tenant network 110A. In some examples, the secure tunnel service 168 is a cloud-based service (e.g., executing using computing resources provided by a provider network 102) configured to transfer data between an IT and security operations application 100 and computing devices located on networks external to the provider network 102, including on-premises action execution agents, mobile devices, and the like. In other examples, the secure tunnel service 168 executes using computing resources located outside of a cloud-based environment.

In some examples, the secure tunnel service 168 performs authentication operations with other components (e.g., the IT and security operations application 100 and an on-premises proxy 130 or on-premises action execution agent 144) to establish trust and then establishes secure communications channels with those components, where the secure tunnel service 168 and other components transmit secure communications using the secure communications channels. In some examples, the secure tunnel service 168 provides end-to-end encryption (E2EE) of communications between the IT and security operations application 100 and an on-premises action execution agent 144 via an on-premises proxy 130 by transmitting one or more encrypted data packets between the IT and security operations application 100 and the on-premises proxy 130. In some examples, communications sent through the secure tunnel service 168 are in the form of data packets, where each data packet includes, for example, a payload and a device identifier for a destination device that is to receive the data packet. In other examples, the data packet can also include a device identifier for the source device or an instance identifier that indicates an IT and security operations application instance associated with the data packet. In some examples, the data packet is encrypted prior to being transmitted to the secure tunnel service 168, e.g., using a public key of an asymmetric key pair generated by a receiving device. While in some examples, the secure tunnel service 168 decrypts the data packet before sending the data packet to its intended destination, in other examples, the secure tunnel service 168 forwards the encrypted data packet to its intended destination without performing a decryption process.

The IT and security operations application 100 and on-premises proxy 130 can communicate with the secure tunnel service 168 across network(s) 112. As indicated herein, the networks 112 can be communications networks, such as a local area network (LAN), wide area network (WAN), cellular network (e.g., LTE, HSPA, 3G, 4G, and/or any other network based on cellular technologies), and/or networks using any of wired, wireless, terrestrial microwave, or satellite links. In some examples, after an on-premises action execution agent 144 is installed and executed within a tenant network 110A, the on-premises action execution agent 144 uses an on-premises proxy 130 to initiate a process to establish a secure connection (e.g., a gRPC Remote Procedure Calls (gRPC) over HTTP/2 connection) with a secure tunnel service 168. For example, the secure tunnel service 168 may establish the secure connection and associate the secure connection with a device identifier for the on-premises proxy 130.

In some examples, the secure tunnel service 168 maintains a database that stores document data structures and optionally stores keys. This database, for example, can be a structure query language (SQL) database, or a NoSQL database, such as an AMAZON® DynamoDB. In some examples, the database includes a key store that stores encryption keys, including single-use session keys and long-term keys associated with devices that send E2EE communications. In other examples, the secure tunnel service 168 does not store encryption keys and routes messages without the use of a key store. In some examples, the database also includes a routing table that includes address information associated with devices registered with the secure tunnel service 168 with which the service has established secure communications. The secure tunnel service 168, for example, can send queries to the database to determine, based on a device identifier in a particular data packet, the address of the intended recipient of the particular data packet.

As illustrated in FIG. 1, the secure tunnel service 168 may not directly communicate with an on-premises action execution agent 144 but communicate instead through an on-premises proxy 130. As indicated herein, the on-premises proxy 130 is a process executing in the tenant network 110A and that operates as a gateway between the secure tunnel service 168 and the IT and security operations application 100. The on-premises proxy 130 is configured to receive messages from the secure tunnel service 168 and forward the messages to the on-premises action execution agent 144 for processing. The on-premises proxy 130 can also be configured to generate and send messages (e.g., notifications, alerts, etc.) IT and security operations application 100 via the secure tunnel service 168. In some examples, the on-premises proxy 130 can also send messages to configured mobile devices in accordance with a push notification service, such as the APPLE® Push Notification service (APN), or GOOGLE® Cloud Messaging (GCM). In some examples, the on-premises proxy 130 is configured to perform the management, generation, and registration of encryption keys used to communicate with the secure tunnel service 168.

Figure 2:
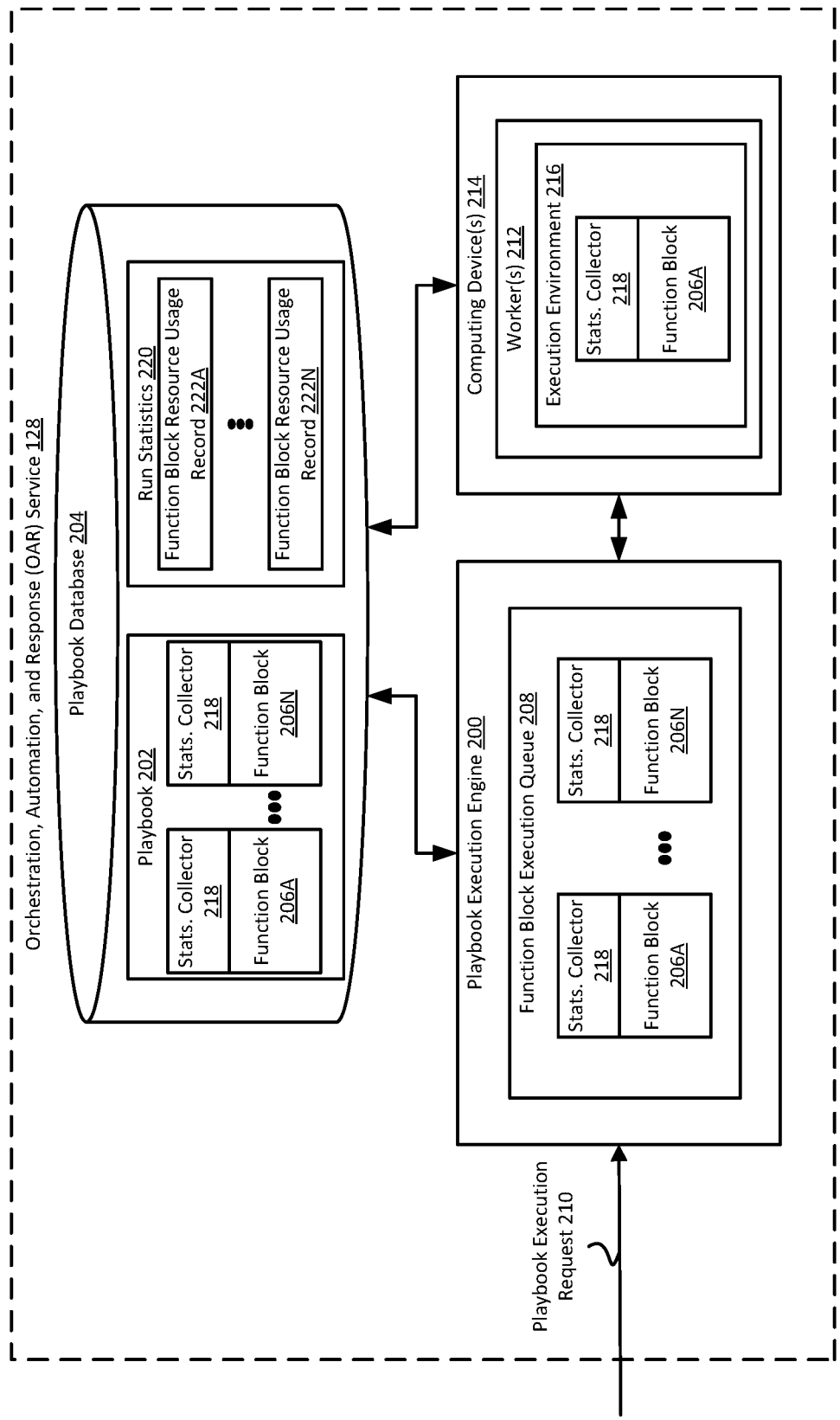
FIG. 2 is a block diagram of an example computing environment in which an IT and security operations application provides playbook run statistics according to some examples.

FIG. 2 illustrates an example architecture for an IT and security operations application playbook execution engine capable of collecting playbook run statistics during playbook execution according to some examples. As shown, the playbook execution engine 200 (which may be part of the OAR service 128 or any other component of an IT and security operations application 100) executes playbooks from time to time (such as an example playbook 202 stored in a playbook database 204). As described in more detail hereinafter, execution of a playbook generally involves the playbook execution engine 200 executing the function blocks of the playbook in an order defined by a control flow associated with the playbook (and possibly further based on a container context comprising data about an incident associated with the execution of the playbook). According to examples described herein, the execution of a playbook can further include the collection of run statistics associated with the execution of the individual function blocks that are part of a playbook.

For example, a playbook 202 can include any number of function blocks 206A, . . . , through function block 206N. Some of the function blocks of playbook 202 may be a same, reusable function block that can be used across any number of playbooks (e.g., template function blocks provided by the IT and security operations application 100), while other function blocks may represent custom code function blocks developed by individual users of the IT and security operations application. A playbook can be executed manually responsive to a user requesting execution of the playbook, or a playbook can be executed automatically responsive to an IT and security operations application 100 identifying one or more incidents matching certain triggering criteria associated with the playbook. In general, each playbook can include any number and combination of function blocks depending on the desired functionality to be implemented by the playbook. While only one playbook is shown in FIG. 2, in general, an IT and security operations application 100 can be associated with any number of distinct playbooks associated with any number of separate users or tenants of the application. Furthermore, at any given time, a playbook execution engine 200 can receive any number of concurrent or overlapping requests to execute a same playbooks or different playbooks.

In some examples, to manage the execution of requested playbooks, a playbook execution engine 200 manages one or more function block execution queues (e.g., such as a function block execution queue 208). Each queue, for example, can be used to queue a different type of function block associated with playbooks executed by the playbook execution engine 200. For example, one function block execution queue can be used to queue and to subsequently delegate the execution of function blocks implemented using a first version of a programming language (e.g., function blocks implemented by code written in Python version 2.0), a second queue can be used to queue and to delegate execution of function blocks implemented using a second version of the programming language (e.g., function blocks implemented by code written in Python version 3.0, or implemented using a different programming language entirely such as Java®, Scala, etc.), while a third function block execution queue can be used to queue and to delegate execution of other types of commands (e.g., global updates, logging level changes, etc.).

As indicated above, the execution of a playbook by the playbook execution engine 200 generally involves the execution of function blocks defining the functionality of the playbook. However, in other examples, the playbook execution engine 200 can execute such function blocks more generally as a collection of commands defined by the engine, where the execution of each command correspond to one or more of a playbooks' function blocks or may correspond to other types of operations that relate to the context of a playbook's execution (e.g., commands to enqueue custom functions, and the like). In this example, the execution of a playbook can be initiated by a playbook run command that generates additional commands with a same playbook run identifier. A playbook execution is then considered complete once all commands associated with a corresponding playbook run identifier have been processed and a "finish" command is invoked. As described in more detail hereinafter, during execution of a playbook, function blocks or commands can be enqueued directly by the playbook execution engine 200 or via inter-process communications from a worker process. Thus, it may be understood that references to the execution of function blocks by the playbook execution engine 200 can further involve the management and execution of commands or other additional data constructs as part of a playbook's execution.

Responsive to a playbook execution engine 200 receiving a request 210 to execute a playbook, the playbook execution engine 200 determines, based on metadata associated with the playbook or with the function blocks of the playbook, a queue in which to place each of the respective playbook function blocks as needed. The metadata associated with the playbook or function block may indicate, for example, a type and version of programming language associated with a function block, expected input and output data types, dependencies on other function blocks in the same playbook or dependencies with other playbooks, and the like. Based on this information, the playbook execution engine 200 can add one or more of the function blocks associated with a playbook into a corresponding queue (e.g., function block execution queue 208) once it is determined that a function block is to be executed (e.g., based on identification of the function block as a next action by a previously executed function block in the same playbook or based on any other condition).

As indicated herein, the playbooks and associated function blocks can be stored as data objects in a database managed by the IT and security operations application 100 (e.g., a dedicated playbooks database 204 or other data store). The retrieval of a playbook and associated function blocks thus may involve obtaining the associated data from the database, e.g., including playbook metadata, function block metadata (e.g., indicating inputs and outputs, function block dependencies, identification of downstream function blocks, etc.), and function block code as needed. In some examples, upon receiving a request to execute a playbook, the playbook execution engine 200 obtains all the data associated with the playbook from the data store and executes individual function blocks as needed. In other examples, the playbook execution engine 200 obtains individual function blocks from the database on-demand during execution of a playbook (e.g., a function block can be obtained only when the function block is encountered during execution of the playbook, while other functions that are not encountered may not be retrieved).

As indicated, in some examples, the function blocks of a playbook can be added to a function block execution queue of the playbook execution engine 200 on demand. For example, upon initiating execution of a playbook, the playbook execution engine 200 can initially enqueue a start block of the playbook for execution (or execute the start block without enqueuing it), where data associated with the start block identifies one or more subsequent function blocks to execute (e.g., as defined by a control flow associated with the playbook and linking the function blocks of the playbook to one another). Once the subsequent function blocks to execute are identified based on processing the start block, the function blocks can be added to one or more function block execution queues based on metadata identifying characteristics of the function blocks, as described above.

In the example of FIG. 2, the function block execution queue 208 has function block 206A, . . . , function block 206N from playbook 202, among other possible function blocks. The example illustrated in FIG. 2 illustrates an example state of an execution queue at a single point in time; in general, the status of each of a queue changes over time as new playbook executions are requested, as the execution of function blocks of the playbooks is invoked, and as the execution of additional function blocks is requested based on the execution of upstream function blocks.

In some examples, a function block execution queue is associated a "dispatcher" process responsible for managing the contents of the queue and for delegating the execution of function blocks in the associated queue to worker processes (e.g., to workers 212 running on one or more computing device(s) 214). In some examples, a dispatcher process monitors the queue and determines when a function block is ready for execution (for example, when any dependencies associated with the function block have been fulfilled or based on other conditions). Once identified, the dispatcher process determines whether there is an available worker 212 that can execute the function block. For example, the dispatcher process can determine whether there exists a worker that hosts an appropriate execution environment (e.g., an execution environment 216 compatible with the programming language and programming language version of the function block) and that is not currently busy (e.g., one that is not executing other function blocks or performing other management operations).

In some examples, the playbook execution engine 200 maintains state information about the existence and status of workers 212 that can be used by the dispatcher processes to execute function blocks. The state information associated with a fleet of workers, for example, can include identifiers of currently instantiated workers 212, a type of execution environment associated with each worker, a status of each worker (e.g., idle, executing a function block, unknown, etc.), a playbook run identifier associated with each worker, among other possible information. In some examples, the status of each worker is determined in part based on inter-process communications (IPC) or other messages exchanged between the playbook execution engine 200 and the workers during operation.

The execution of function blocks of a same playbook can involve the use of shared context or state information, for example, based on the use of one or more global variables or data structures in the playbook that are referenced in two or more function blocks. In this example, the identification of a suitable worker can involve the dispatcher process determining whether there is an existing worker that is executing function blocks associated with a same playbook run identifier. In this manner, the playbook execution engine 200 can maintain an affinity between a playbook and a worker such that the worker can maintain state that is used among two or more separate function blocks of the playbook. In other examples, the execution of each function block of a playbook is stateless and a function block can be executed by a same or different worker relative to workers used to execute other function blocks from the same playbook.

If a dispatcher process is unable to identify an existing worker capable of executing a pending function block, in some examples, the dispatcher process or playbook execution engine 200 can instantiate a new worker process depending on a scaling limit associated with the playbook execution engine 200. For example, in general, any number of separate worker processes can be created to concurrently execute function blocks while maintaining function block dependencies as discussed herein. However, optionally, a maximum scaling limit can be used to limit a total number of worker processes that can be instantiated at any given time (e.g., to ensure that available CPU, memory, or other resources are not overutilized). In some examples, the maximum scaling limit can be specified by a user of the IT and security operations application 100 and modified as desired (e.g., based on an amount of computing resources that the user has allocated to the execution of the IT and security operations application 100). In this manner, if it does not violate any defined scaling limits, a dispatcher process can instantiate a new worker if an available worker for a given function block is not available. The instantiation of a new worker 212 can include, for example, creating a new child process, launching a new VM or container, invoking an on-demand executable function, or causing the instantiation of any other type of computing resource used to host a copy of an execution environment suitable for executing function blocks.

The creation of a new worker can, in some examples, involve creating a worker capable of hosting a specific type of execution environment from a plurality of possible execution environments. For example, if the playbook execution engine 200 supports multiple different programming languages or programming language versions, the playbook execution engine can launch workers with an execution environment specific to each programming language or programming language version. In some examples, a worker also generally includes functionality capable of receiving IPC or other messages from a playbook execution engine 200 to execute function blocks, to receive other system state information, to optionally queue multiple function blocks for execution, to obtain playbook, function block, and incident data from one or more external databases or other data sources, to execute function blocks, to optionally maintain state information used across multiple function blocks, to obtain a result of a function block execution and determine a next action (e.g., return one or more values, identify one or more subsequent function blocks to execute, etc.), to format a response to the playbook execution engine 200 indicating the function block execution results, to report error or other logging information, and the like.

Once an available worker is identified, in some examples, the playbook execution engine 200 sends a request (e.g., via an IPC message, API, or other interface) to the worker to execute the function block. In some examples, the request includes structured or semi-structured data (e.g., JSON or XML-formatted data) identifying the function block among other possible status information. Upon receiving a request to execute a function block, in some examples, the worker 212 obtains information about the function block from a database (e.g., playbook database 204. The information about the function block can include the program code associated with the block, function block metadata, and the like. In FIG. 2, for example, a worker 212 has received a request to execute a function block 206A using the hosted execution environment 216; similarly, other workers 212 can receive a request to execute other function blocks using other hosted execution environments.

As indicated above, each of execution environments 216 can support the execution of a same type of function block or may each respectively support the execution of different types of function blocks (e.g., function blocks defined by program code written in different programming languages or programming language versions). Furthermore, different workers can potentially concurrently execute separate function blocks from a same playbook (subject to any function block dependency considerations). In this manner, the distributed set of workers 212 enables the execution of function blocks of a same playbook, function blocks from different playbooks, and function blocks associated with different execution environments to be vertically scaled. As illustrated, the workers execute on one or more computing device(s) 214 (one or more of which may also be responsible for executing the playbook execution engine 200), where a number of computing device(s) 214 can be scaled as needed to support more or fewer workers in a given environment.

In some examples, upon obtaining any data used to execute a function block that has been assigned to a worker, the worker causes execution of the function block using its respective execution environment. For example, the worker can cause program code associated with the function block to be executed by an interpreter or other execution environment suitable for the type of programming language used for the function block. As indicated herein, a function block generally can cause the performance of a wide range of actions involving an IT environment including, e.g., modifying settings associated with a computing asset, obtaining enrichment data from various data sources, executing search queries (e.g., against data stored by the IT and security operations application 100 or data intake and query system 114), etc., and can include custom code provided by a user of an IT and security operations application 100.

Once a function block is executed, either by the playbook execution engine 200 or one of the workers, the engine or a worker generates results information including, for example, any output values associated with execution of the function block and an indication of one or more downstream blocks to be executed following the function block (where such function blocks, e.g., may receive as input one or more of the output values of the executed function block and possibly from other function blocks). In some examples, a worker sends a message including the function block execution results back to the playbook execution engine 200. As indicated above, the playbook execution engine 200 uses information about the results of a function block execution to identify additional function blocks in the various queues to execute next, to enqueue one or more additional function blocks, among other possible operations. For any given playbook, the playbook execution engine 200 can continue executing the playbook this manner until an end state is reached in the execution of the playbook (e.g., as identified by an end block), at which point the playbook execution engine 200 can return status information to other components of the IT and security operations application 100 (e.g., indicating whether execution of the playbook was successful, an elapsed time to execute the playbook, etc.).

In some examples, the playbook execution engine 200 creates a "run record" and an associated run identifier for each playbook execution instance. For example, a run identifier can be associated with a playbook's function blocks such that function blocks associated with a same execution of a playbook are associated with a same run identifier (and corresponding run record). In this manner, a respective context associated with each of multiple concurrent executions of a same playbook can be distinguished using the distinct run identifiers. For example, a function block execution queue 208 might contain multiple instances of a same function block from the playbook, but each instance of the function block is associated with a different run record via a respective run identifier.

The example illustrated in FIG. 2 further illustrates that the function blocks of a playbook can be further supplemented with code or other functionality used to collect playbook run statistics for each function block. For example, each of function block 206A, . . . , function block 206N is associated with a respective statistics collector 218, each representing additional code that, upon execution of the corresponding function block, collects and stores run statistics associated with the function block. As described in more detail herein, these statistics can include, for example, a number of database queries executed by a function block, an average latency of the database queries executed by the function block, an amount of time for the function block to execute, a number of bytes transmitted via Hypertext Transfer Protocol (HTTP) requests sent by the function block (e.g., executing the function block can include initiating interactions with a computing device or service that is external to the IT and security operations application and, thus, the playbook runs statistics can include statistics reflecting those interactions), a number of bytes transmitted via HTTP requests received by the function block, an average amount of time between HTTP requests sent by the function block and corresponding HTTP requests received by the function block, a number of HTTP requests sent by the function block, a number of times the block is executed, a number of times the function block completed successfully, a number of times the function block failed, and the like.

In some examples, users can enable the collection of playbook run statistics for individual playbooks, or for all of a users' playbooks, by providing input via a visual playbook editor or other interface of the IT and security operations application 100. In other examples, the collection of playbook run statistics is enabled by default and visible to users upon request to display the statistics for a selected playbook. Upon enabling the collection of playbook run statistics, in some examples, a visual playbook editor or other component automatically adds source code to the playbook that implements the collection of playbook run statistics. As indicated, the added source code is executed during execution of the playbook by the playbook execution engine 200, where the collected statistics are stored in a database (as run statistics 220 stored in the playbook database 204 or other data store). As shown, the statistics collector 218 can optionally store a separate function block resource usage record for each function block executed by a worker 212 (e.g., shown as function block resource usage record 222A, . . . , function block resource usage record 222N). In other examples, the statistics collected for a same playbook can be aggregated into a single record or other format stored in a playbook database 204 or other datastore accessible to the playbook execution engine 200 or workers 212.

In the example of Python-based playbooks, in some examples, the visual playbook editor or other component of the IT and security operations application 100 adds "decorators" to the code associated with each function block of the playbook. A decorator is syntax in Python for calling-higher order functions. In particular, a decorator is a function that takes another function as input and extends the behavior of the input function without explicitly modifying the function it "decorates." In this example, the decorator added by the visual playbook editor calls a higher-order function that implements the collection of playbook run statistics for each function to which the decorator is added and stores a record with the collected statistics. In other examples, users can add the decorator to the code manually, e.g., to enable the IT and security operations application to collect statistics for custom function blocks or to add the functionality outside of a visual playbook editor.

The statistics collector 218 code that collects the statistics can, for example, obtain the statistics from the runtime executing the function block code and/or other components involved in the execution of the playbook code (e.g., any processes involved in implementing the playbook execution engine 200). Depending on the programming language or other type of code used to implement the playbooks, other types of statistics collectors 218 can be used such as, e.g., libraries, plug-ins, etc., capable of monitoring function block execution time, HTTP requests and responses, database calls and responses, and the like. As indicated, the collection of playbook run statistics can be performed for standard function blocks (e.g., ones provided by default in a visual playbook editor) and custom function blocks including custom code provided by a user of the IT and security operations application. In some examples, the statistics for a custom function block can be the same or different from those collected for standard function blocks, and the statistics for a custom function block can be stored in a same or different database or database table as those for the standard function blocks.

In some examples, the IT and security operations application 100 further includes one or more APIs used to return playbook resource metrics for one or more identified playbooks. The API can further enable query parameters such as function block identifiers, playbook run identifiers, and time ranges. The function block identifier parameter, for example, can be used to obtain playbook run statistics for only one or more specified function blocks of a playbook; the playbook run identifiers can be used to obtain playbook run statistics for only one or more specified playbook runs; and the time range parameter can be used to filter the playbook run statistics to only a specified range of time. In some examples, the API can be controlled by playbook permissions such that, e.g., the playbook run statistics for a particular playbook can be accessed only if an account associated with the request has permissions to access the playbook. The API can be used by other components of the IT and security operations application to display the statistics in a visual playbook editor or interface or used by any other process to obtain the statistics for use.

FIG. 3 illustrates data items stored in an example function block resource usage record as part of the collection of playbook run statistics by an IT and security operations application according to some examples. In this example, the function block resource usage record 300 represents a record generated by a statistics collector 218 during execution of a function block to which the statistics collector has been added, where the record can be stored as part of run statistics 220 in a playbook database 204 or other data store. As shown, the information stored in the function block resource usage record 300 can include performance statistics (e.g., an amount of data in bytes transferred in HTTP requests and responses, a number of database queries, a status of the function block's execution, latency information, etc.) and other metadata (e.g., an identifier of the function block resource usage record, an identifier of the function block to which the statistics relate, a time the function block was executed, an identifier of the associated playbook and an associated playbook run identifier, etc.).

Figure 4:
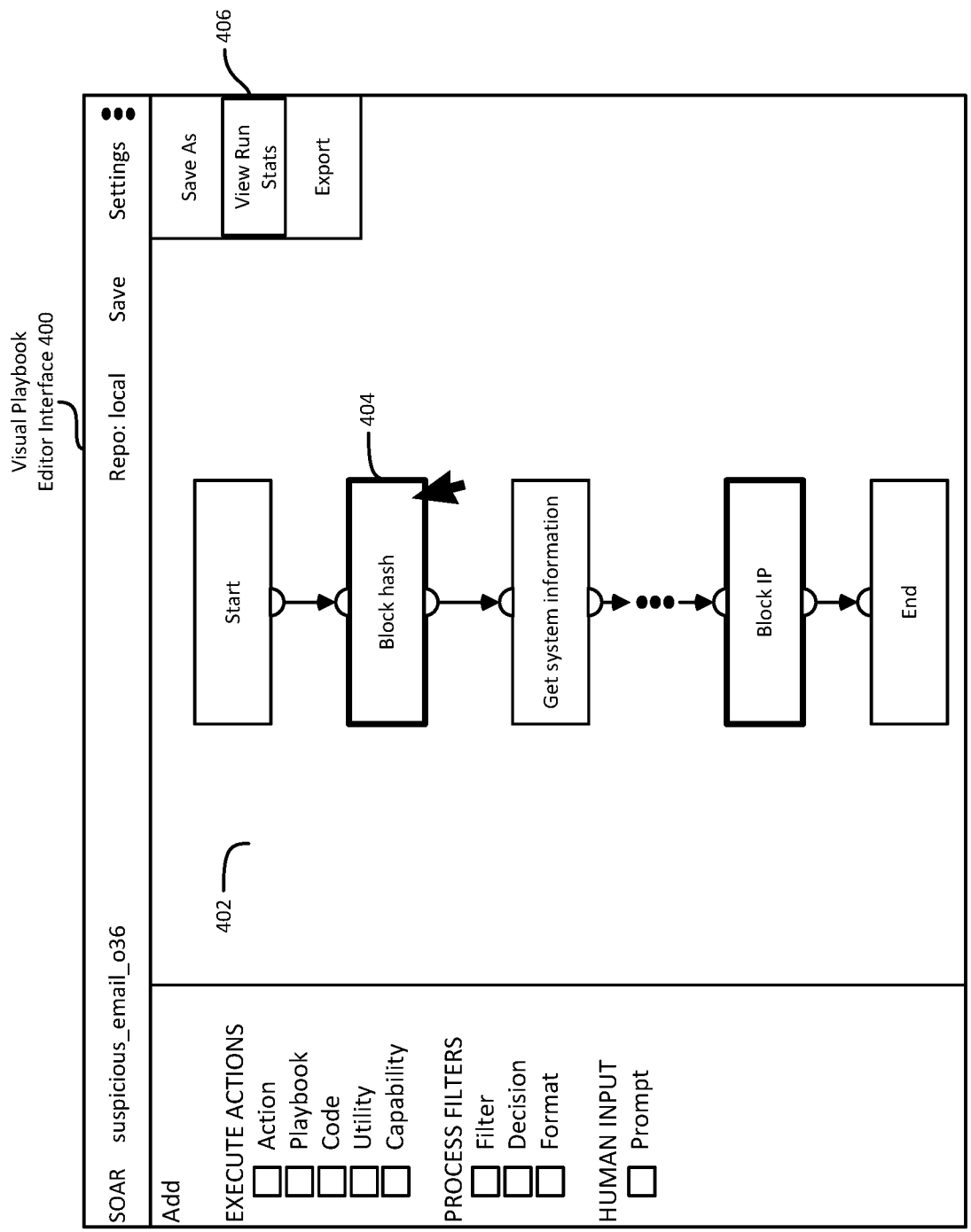
FIG. 4 illustrates an example graphical user interface (GUI) including a visual playbook editor in which users can request to view playbook run statistics according to some examples.

FIG. 4 illustrates an example visual playbook editor interface in which a user can access playbook run statistics for a playbook according to some examples. The visual playbook editor interface 400, for example, includes a playbook canvas 402 showing a playbook including several function blocks including, e.g., a function block 404. The visual playbook editor interface 400 further includes interface elements that enable a user to save the playbook under development, to export the playbook out of the visual playbook editor 400, and to view playbook run statistics for the playbook (e.g., by selecting the menu item 406). Once selected, the visual playbook editor 400 can cause display of a report or other interface indicating the playbook run statistics that have been collected for the playbook.

FIG. 5 illustrates an example visual playbook editor interface in which a user can access playbook run statistics for a playbook according to some examples. As shown, the playbook run statistics can be displayed in the visual playbook editor interface 400 or, in other examples, in a separate interface. In the first column 500 of the table displaying the playbook run statistics, a user can use a playbook run field to select a playbook run that the user desires to investigate (e.g., as identified by a playbook run identifier). A user can optionally use a filter to search for a specific run, if desired.

In some examples, the second column 502 enables users to compare playbook run statistics against the average runs for the playbook over the past 24 hours, past week, or other defined period of time. The third column 504, in some examples, enables users to compare playbook run statistics for a specific other playbook run, where a user can add as many columns as desired to compare multiple different playbook runs, playbook run averages, or combinations thereof.

Figure 6:
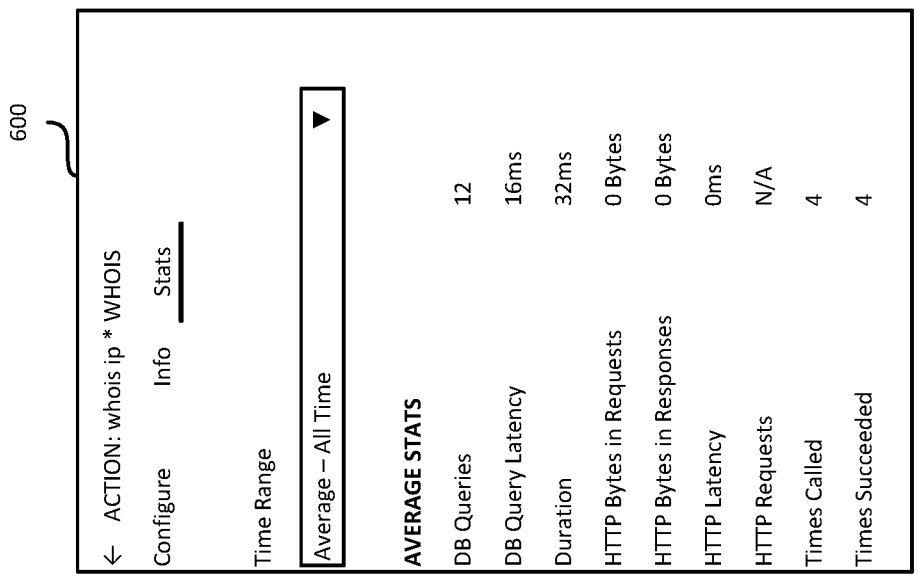
FIG. 6 is a block diagram of GUI displaying function block-specific playbook run statistics according to some examples.

In addition to the display of playbook run statistics for an entire playbook, in some examples, the IT and security operations application further enables users to obtain more detailed statistics for selected function blocks of a playbook. FIG. 6 illustrates an example interface element displaying function block-specific playbook run statistics according to some examples. As shown, the interface panel 600 (which may be part of the visual playbook editor interface 400, or any other interface of the IT and security operations application 100) includes statistics specific to a particular playbook function block (e.g., a "whois ip" function block). The statistics, which can similarly include a number of database queries, database query latency, HTTP request and response information, etc., can be displayed for specific playbook runs, as an all time average or an average over a specified period of time, and the like, thereby enabling users to better diagnose performance-related information associated with a particular function block.

FIG. 7 is a flowchart illustrating an example process 700 for providing playbook run statistics by an IT and security operations application according to some examples. The example process 700 can be implemented, for example, by a computing device that comprises a processor and a non-transitory computer-readable medium. The non-transitory computer readable medium can be storing instructions that, when executed by the processor, can cause the processor to perform the operations of the illustrated process 700. Alternatively or additionally, the process 700 can be implemented using a non-transitory computer-readable medium storing instructions that, when executed by one or more processors, case the one or more processors to perform the operations of the process 700 of FIG. 7.

The process 700 includes, at block 702, executing, by an information technology (IT) and security operations application, a playbook including a plurality of function blocks, wherein the plurality of function blocks collectively defines a series of operations to be performed responsive to identification of an incident in an IT environment, and wherein each function block of the plurality of function blocks includes computer program source code that is executed upon encountering the function block during execution of the playbook;

The process 700 further includes, at block 704, monitoring, by the IT and security operations application, execution of each of the plurality of function blocks to obtain a plurality of playbook run statistics for the playbook.

The process 700 further includes, at block 706, causing display of a report indicating the plurality of playbook run statistics.

In some examples, the plurality of playbook run statistics includes block-specific statistics for a function block of the plurality function blocks, and wherein the block-specific statistics include at least one of: a number of database queries executed by the function block, an average latency of the database queries executed by the function block, an amount of time for the function block to execute, a number of bytes transmitted via Hypertext Transfer Protocol (HTTP) requests sent by the function block, a number of bytes transmitted via HTTP requests received by the function block, an average amount of time between HTTP requests sent by the function block and corresponding HTTP requests received by the function block, a number of HTTP requests sent by the function block, a number of times the block is executed, a number of times the function block completed successfully, or a number of times the function block failed.

In some examples, executing the playbook is a first run of the playbook, and the operations further include: executing, by the IT and security operations application, a plurality of runs of the playbook including the first run; obtaining playbook run statistics for each run of the plurality of runs of the playbook; and wherein the report includes an average of one or more of the playbook run statistics for the plurality of runs.

In some examples, wherein executing the playbook is a first run of the playbook, wherein the playbook run statistics are first playbook run statistics associated with the first run of the playbook, and the operations further include: executing, by the IT and security operations application, a plurality of runs of the playbook; obtaining playbook run statistics for each run of the plurality of runs of the playbook; and wherein the report displays both the first playbook run statistics, and an average of one or more of the playbook run statistics for the plurality of runs of the playbook.

In some examples, the operations further include receiving input requesting to enable generation of the plurality of playbook run statistics for the playbook; adding, by the IT and security operations application, source code to the playbook used to generate the plurality of playbook run statistics; and wherein monitoring execution of each of the plurality of function blocks includes executing the source code used to generate the plurality of playbook run statistics.

In some examples, the operations further include receiving, via the report, selection of a function block of the plurality of function blocks; and displaying playbook run statistics specific to the function block.

In some examples, the operations further include receiving, by the IT and security operations application, an application programming interface (API) request for the plurality of playbook run statistics, wherein the API request identifies the playbook; and sending a response including the plurality of playbook run statistics.

In some examples, the operations further include receiving, by the IT and security operations application, an application programming interface (API) request for the plurality of playbook run statistics, wherein the API request identifies the playbook, and wherein the API request includes one or more request parameters indicating at least one of: a filter identifying a list of function blocks of the playbook, a list of playbook run identifiers associated with the playbook, or a time range of playbook executions; generating filtered playbook run statistics based on the one or more request parameters; and sending a response including the filtered playbook run statistics.

In some examples, the plurality of function blocks includes a custom code function block, wherein the custom code function block includes source code provided by a user of the IT and security operations application, and wherein the plurality of playbook run statistics include statistics associated with execution of the custom code function block.

In some examples, monitoring execution of each of the plurality of function blocks to obtain a plurality of playbook run statistics for the playbook includes: collecting, based on execution of source code included in the playbook, first playbook run statistics; collecting, based on operation of a playbook execution engine executing the playbook, second playbook run statistics; and storing the first playbook run statistics and the second playbook run statistics in a database.

In some examples, the operations further include executing, by a playbook execution engine, a function block of the plurality of function blocks, wherein executing the function block includes initiating interactions with a computing device or service that is external to the IT and security operations application; and wherein playbook run statistics for the function block reflect the function block's interacting with the computing device or service.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 8:
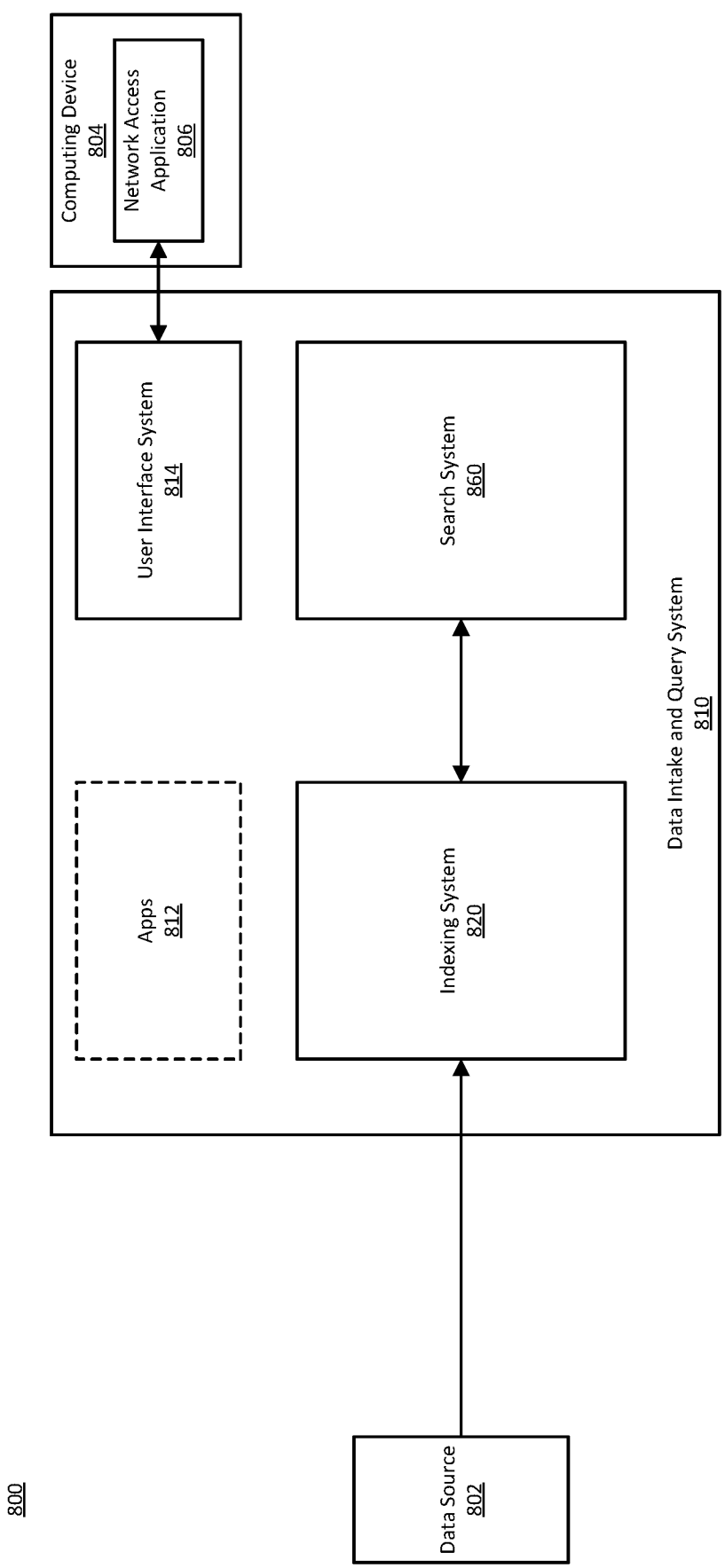
FIG. 8 is a block diagram illustrating in greater detail an example of an indexing system of a data intake and query system according to some examples.

FIG. 8 is a block diagram illustrating an example computing environment 800 that includes a data intake and query system 810. The data intake and query system 810 obtains data from a data source 802 in the computing environment 800, and ingests the data using an indexing system 820. A search system 860 of the data intake and query system 810 enables users to navigate the indexed data. Though drawn with separate boxes, in some implementations the indexing system 820 and the search system 860 can have overlapping components. A computing device 804, running a network access application 806, can communicate with the data intake and query system 810 through a user interface system 814 of the data intake and query system 810. Using the computing device 804, a user can perform various operations with respect to the data intake and query system 810, such as administration of the data intake and query system 810, management and generation of "knowledge objects," initiating of searches, and generation of reports, among other operations. The data intake and query system 810 can further optionally include apps 812 that extend the search, analytics, and/or visualization capabilities of the data intake and query system 810.

The data intake and query system 810 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 810 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 810 can execute on a single computing device, or may be distributed over multiple computing devices. For example, the program code can include instructions for executing both indexing and search components (which may be part of the indexing system 820 and/or the search system 860, respectively), and can be executed on a computing device that also provides the data source 802. As another example, the program code can execute on one computing device, where the program code executes both indexing and search components, while another copy of the program code executes on a second computing device that provides the data source 802. As another example, the program code can execute only an indexing component or only a search component. In this example, a first instance of the program code that is executing the indexing component and a second instance of the program code that is executing the search component can be executing on the same computing device or on different computing devices.

The data source 802 of the computing environment 800 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 802 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 820 obtains machine date from the data source 802 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 820 does not require prior knowledge of the structure of incoming data (e.g., the indexing system 820 does not need to be provided with a schema describing the data). Additionally, the indexing system 820 retains a copy of the data as it was received by the indexing system 820 such that the original data is always available for searching (e.g., no data is discarded, though, in some examples, the indexing system 820 can be configured to do so).

The search system 860 searches the data stored by the indexing system 820. As discussed in greater detail below, the search system 860 enables users associated with the computing environment 800 (and possibly also other users) to navigate the data, generate reports, and visualize results in "dashboards" output using a graphical interface. Using the facilities of the search system 860, users can obtain insights about the data, such as retrieving events from an index, calculating metrics, searching for specific conditions within a rolling time window, identifying patterns in the data, and predicting future trends, among other examples. To achieve greater efficiency, the search system 860 can apply map-reduce methods to parallelize searching of large volumes of data. Additionally, because the original data is available, the search system 860 can apply a schema to the data at search time. This allows different structures to be applied to the same data, or for the structure to be modified if or when the content of the data changes. Application of a schema at search time may be referred to herein as a late-binding schema technique.

The user interface system 814 provides mechanisms through which users associated with the computing environment 800 (and possibly others) can interact with the data intake and query system 810. These interactions can include configuration, administration, and management of the indexing system 820, initiation and/or scheduling of queries to the search system 860, receipt or reporting of search results, and/or visualization of search results. The user interface system 814 can include, for example, facilities to provide a command line interface or a web-based interface.

Users can access the user interface system 814 using a computing device 804 that communicates with data intake and query system 810, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 800. For example, a person can log in as a particular user and, using the user's digital information, can access the data intake and query system 810. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 804 can provide a human-machine interface through which a person can have a digital presence in the computing environment 800 in the form of a user. The computing device 804 is an electronic device having one or more processors and a memory capable of storing instructions for execution by the one or more processors. The computing device 804 can further include input/output (I/O) hardware and a network interface. Applications executed by the computing device 804 can include a network access application 806, which can a network interface of the client computing device 804 to communicate, over a network, with the user interface system 814 of the data intake and query system 810. The user interface system 814 can use the network access application 806 to generate user interfaces that enable a user to interact with the data intake and query system 810. A web browser is one example of a network access application. A shell tool can also be used as a network access application. In some examples, the data intake and query system 810 is an application executing on the computing device 804. In such examples, the network access application 806 can access the user interface system 814 without needed to go over a network.

The data intake and query system 810 can optionally include apps 812. An app of the data intake and query system 810 is a collection of configurations, knowledge objects (a user-defined entity that enriches the data in the data intake and query system 810), views, and dashboards that may provide additional functionality, different techniques for searching the data, and/or additional insights into the data. The data intake and query system 810 can execute multiple applications simultaneously. Example applications include an information technology service intelligence application, which can monitor and analyze the performance and behavior of the computing environment 800, and an enterprise security application, which can include content and searches to assist security analysts in diagnosing and acting on anomalous or malicious behavior in the computing environment 800.

Though FIG. 8 illustrates only one data source, in practical implementations, the computing environment 800 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 800, the data intake and query system 810 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 800 can include on-prem and cloud-based computing resources, or only cloud-based resources. For example, an entity may have on-prem computing devices and a private cloud. In this example, the entity operates the data intake and query system 810 and can choose to execute the data intake and query system 810 on an on-prem computing device or in the cloud. In another example, a provider entity operates the data intake and query system 810 in a public cloud and provides the functionality of the data intake and query system 810 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 810. In some implementations, the entity providing the data intake and query system 810 is itself subscribing to the cloud services of a cloud service provider. As an example, a first entity provides computing resources under a public cloud service model, a second entity subscribes to the cloud services of the first provider entity and uses the cloud computing resources to operate the data intake and query system 810, and a third entity can subscribe to the services of the second provider entity in order to use the functionality of the data intake and query system 810. In this example, the data sources are associated with the third entity, users accessing the data intake and query system 810 are associated with the third entity, and the analytics and insights provided by the data intake and query system 810 are for purposes of the third entity's operations.

Figure 9:
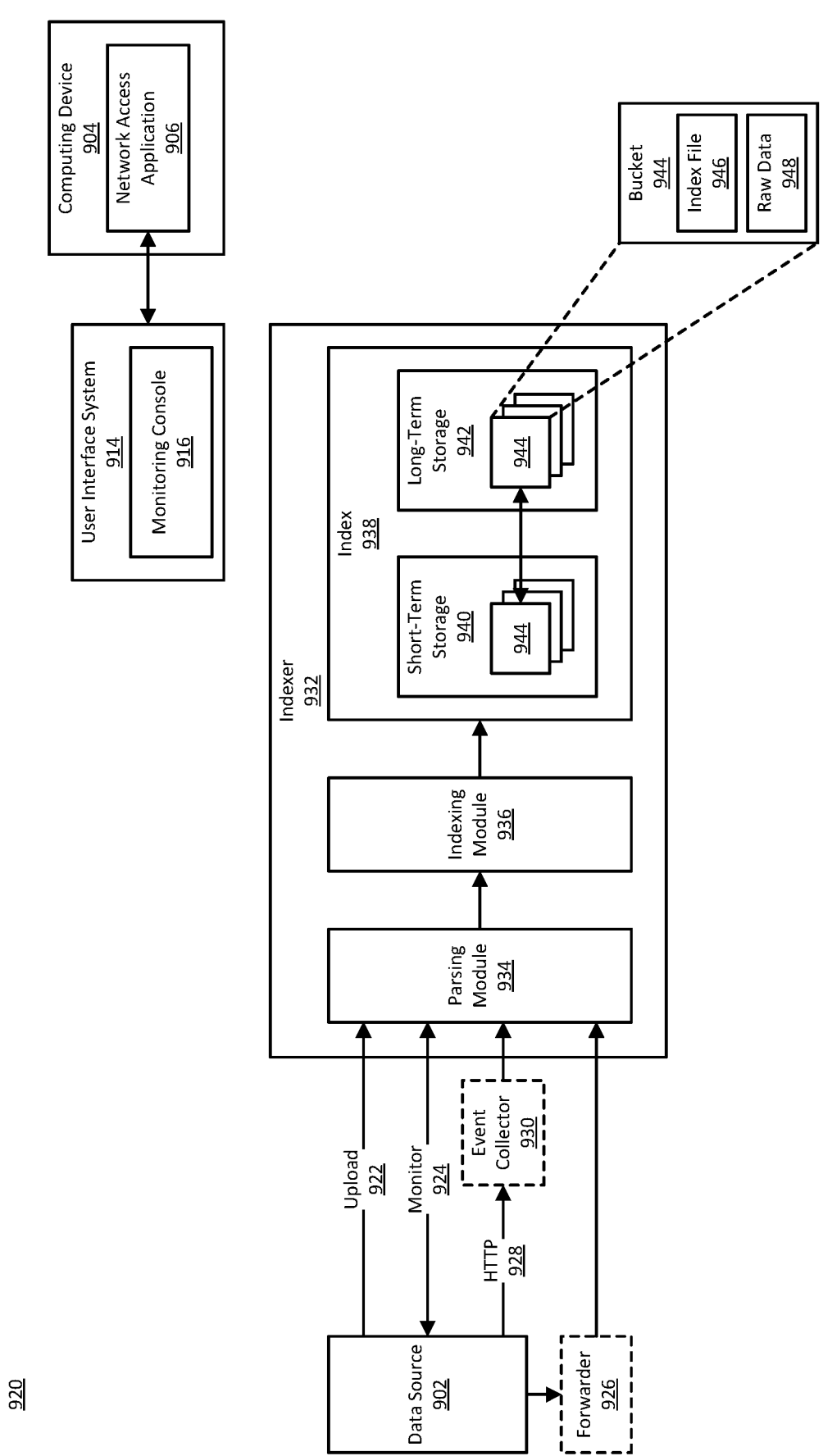
FIG. 9 is a block diagram illustrating in greater detail an example of the search system of a data intake and query system according to some examples.

FIG. 9 is a block diagram illustrating in greater detail an example of an indexing system 920 of a data intake and query system, such as the data intake and query system 810 of FIG. 8. The indexing system 920 of FIG. 9 uses various methods to obtain machine data from a data source 902 and stores the data in an index 938 of an indexer 932. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 920 enables the data intake and query system to obtain the machine data produced by the data source 902 and to store the data for searching and retrieval.

Users can administer the operations of the indexing system 920 using a computing device 904 that can access the indexing system 920 through a user interface system 914 of the data intake and query system. For example, the computing device 904 can be executing a network access application 906, such as a web browser or a terminal, through which a user can access a monitoring console 916 provided by the user interface system 914. The monitoring console 916 can enable operations such as: identifying the data source 902 for indexing; configuring the indexer 932 to index the data from the data source 902; configuring a data ingestion method; configuring, deploying, and managing clusters of indexers; and viewing the topology and performance of a deployment of the data intake and query system, among other operations. The operations performed by the indexing system 920 may be referred to as "index time" operations, which are distinct from "search time" operations that are discussed further below.

The indexer 932, which may be referred to herein as a data indexing component, coordinates and performs most of the index time operations. The indexer 932 can be implemented using program code that can be executed on a computing device. The program code for the indexer 932 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 932. In some implementations, the indexer 932 executes on the computing device 904 through which a user can access the indexing system 920. In some implementations, the indexer 932 executes on a different computing device.

The indexer 932 may be executing on the computing device that also provides the data source 902 or may be executing on a different computing device. In implementations wherein the indexer 932 is on the same computing device as the data source 902, the data produced by the data source 902 may be referred to as "local data." In other implementations the data source 902 is a component of a first computing device and the indexer 932 executes on a second computing device that is different from the first computing device. In these implementations, the data produced by the data source 902 may be referred to as "remote data." In some implementations, the first computing device is "on-prem" and in some implementations the first computing device is "in the cloud." In some implementations, the indexer 932 executes on a computing device in the cloud and the operations of the indexer 932 are provided as a service to entities that subscribe to the services provided by the data intake and query system.

For a given data produced by the data source 902, the indexing system 920 can be configured to use one of several methods to ingest the data into the indexer 932. These methods include upload 922, monitor 924, using a forwarder 926, or using HyperText Transfer Protocol (HTTP 928) and an event collector 930. These and other methods for data ingestion may be referred to as "getting data in" (GDI) methods.

Using the upload 922 method, a user can instruct the indexing system to 902 to specify a file for uploading into the indexer 932. For example, the monitoring console 916 can include commands or an interface through which the user can specify where the file is located (e.g., on which computing device and/or in which directory of a file system) and the name of the file. Once uploading is initiated, the indexer 932 processes the file, as discussed further below. Uploading is a manual process and occurs when instigated by a user. For automated data ingestion, the other ingestion methods are used.

The monitor 924 method enables the indexing system 920 to monitor the data source 902 and continuously or periodically obtain data produced by the data source 902 for ingestion by the indexer 932. For example, using the monitoring console 916, a user can specify a file or directory for monitoring. In this example, the indexing system 920 can execute a monitoring process that detects whenever data is added to the file or directory and causes the data to be sent to the indexer 932. As another example, a user can specify a network port for monitoring. In this example, a monitoring process can capture data received at or transmitting from the network port and cause the data to be sent to the indexer 932. In various examples, monitoring can also be configured for data sources such as operating system event logs, performance data generated by an operating system, operating system registries, operating system directory services, and other data sources.

Monitoring is available when the data source 902 is local to the indexer 932 (e.g., the data source 902 is on the computing device where the indexer 932 is executing). Other data ingestion methods, including forwarding and the event collector 930, can be used for either local or remote data sources.

A forwarder 926, which may be referred to herein as a data forwarding component, is a software process that sends data from the data source 902 to the indexer 932. The forwarder 926 can be implemented using program code that can be executed on the computer device that provides the data source 902. A user launches the program code for the forwarder 926 on the computing device that provides the data source 902. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 926 can provide various capabilities. For example, the forwarder 926 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 926 can break the data into individual events (event generation is discussed further below) and send the events to a receiver. Other operations that the forwarder 926 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 930 provides an alternate method for obtaining data from the data source 902. The event collector 930 enables data and application events to be sent to the indexer 932 using HTTP 928. The event collector 930 can be implemented using program code that can be executing on a computing device. The program code may be a component of the data intake and query system or can be a standalone component that can be executed independently of the data intake and query system and operates in cooperation with the data intake and query system.

To use the event collector 930, a user can, for example using the monitoring console 916 or a similar interface provided by the user interface system 914, enable the event collector 930 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 902 as an alternative method to using a username and password for authentication.

To send data to the event collector 930, the data source 902 is supplied with a token and can then send HTTP 928 requests to the event collector 930. To send HTTP 928 requests, the data source 902 can be configured to use an HTTP client and/or to use logging libraries such as those supplied by Java, JavaScript, and .NET libraries. An HTTP client enables the data source 902 to send data to the event collector 930 by supplying the data, and a Uniform Resource Identifier (URI) for the event collector 930 to the HTTP client. The HTTP client then handles establishing a connection with the event collector 930, transmitting a request containing the data, closing the connection, and receiving an acknowledgment if the event collector 930 sends one. Logging libraries enable HTTP 928 requests to the event collector 930 to be generated directly by the data source. For example, an application can include or link a logging library, and through functionality provided by the logging library manage establishing a connection with the event collector 930, transmitting a request, and receiving an acknowledgement.

An HTTP 928 request to the event collector 930 can contain a token, a channel identifier, event metadata, and/or event data. The token authenticates the request with the event collector 930. The channel identifier, if available in the indexing system 920, enables the event collector 930 to segregate and keep separate data from different data sources. The event metadata can include one or more key-value pairs that describe the data source 902 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 930 extracts events from HTTP 928 requests and sends the events to the indexer 932. The event collector 930 can further be configured to send events or event data to one or more indexers. Extracting the events can include associating any metadata in a request with the event or events included in the request. In these implementations, event generation by the indexer 932 (discussed further below) is bypassed, and the indexer 932 moves the events directly to indexing. In some implementations, the event collector 930 extracts event data from a request and outputs the event data to the indexer 932, and the indexer generates events from the event data. In some implementations, the event collector 930 sends an acknowledgement message to the data source 902 to indicate that the event collector 930 has received a particular request form the data source 902, and/or to indicate to the data source 902 that events in the request have been added to an index.

The indexer 932 ingests incoming data and transforms the data into searchable knowledge in the form of events. In the data intake and query system, an event is a single piece of data that represents activity of the component represented in FIG. 9 by the data source 902. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 932 can include a parsing module 934 and an indexing module 936 for generating and storing the events. The parsing module 934 and indexing module 936 can be modular and pipelined, such that one component can be operating on a first set of data while the second component is simultaneously operating on a second sent of data. Additionally, the indexer 932 may at any time have multiple instances of the parsing module 934 and indexing module 936, with each set of instances configured to simultaneously operate on data from the same data source or from different data sources. The parsing module 934 and indexing module 936 are illustrated to facilitate discussion, with the understanding that implementations with other components are possible to achieve the same functionality.

The parsing module 934 determines information about event data, where the information can be used to identify events within the event data. For example, the parsing module 934 can associate a source type with the event data. A source type identifies the data source 902 and describes a possible data structure of event data produced by the data source 902. For example, the source type can indicate which fields to expect in events generated at the data source 902 and the keys for the values in the fields, and possibly other information such as sizes of fields, an order of the fields, a field separator, and so on. The source type of the data source 902 can be specified when the data source 902 is configured as a source of event data. Alternatively, the parsing module 934 can determine the source type from the event data, for example from an event field or using machine learning.

Other information that the parsing module 934 can determine includes timestamps. In some cases, an event includes a timestamp as a field, and the timestamp indicates a point in time when the action represented by the event occurred or was recorded by the data source 902 as event data. In these cases, the parsing module 934 may be able to determine from the source type associated with the event data that the timestamps can be extracted from the events themselves. In some cases, an event does not include a timestamp and the parsing module 934 determines a timestamp for the event, for example from a name associated with the event data from the data source 902 (e.g., a file name when the event data is in the form of a file) or a time associated with the event data (e.g., a file modification time). As another example, when the parsing module 934 is not able to determine a timestamp from the event data, the parsing module 934 may use the time at which it is indexing the event data. As another example, the parsing module 934 can use a user-configured rule to determine the timestamps to associate with events.

The parsing module 934 can further determine event boundaries. In some cases, a single line (e.g., a sequence of characters ending with a line termination) in event data represents one event while in other cases, a single line represents multiple events. In yet other cases, one event may span multiple lines within the event data. The parsing module 934 may be able to determine event boundaries from the source type associated with the event data, for example from a data structure indicated by the source type. In some implementations, a user can configure rules the parsing module 934 can use to identify event boundaries.

The parsing module 934 can further extract data from events and possibly also perform transformations on the events. For example, the parsing module 934 can extract a set of fields for each event, such as a host or hostname, source or source name, and/or source type. The parsing module 934 may extract certain fields by default or based on a user configuration. Alternatively or additionally, the parsing module 934 may add fields to events, such as a source type or a user-configured field. As another example of a transformation, the parsing module 934 can anonymize fields in events to mask sensitive information, such as social security numbers or account numbers. Anonymizing fields can include changing or replacing values of specific fields. The parsing component 934 can further perform user-configured transformations.

The parsing module 934 outputs the results of processing incoming event data to the indexing module 936, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 932 can be configured to identify searchable segments that are parts of fields, searchable segments that are entire fields, or both. The parsing module 934 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 946, to find event data that matches a search query. In some implementations, segmentation can alternatively be performed by the forwarder 926. Segmentation can also be disabled, in which case the indexer 932 will not build a lexicon for the event data. When segmentation is disabled, the search system searches the event data directly.

Building index data structures generates the index 938. The index 938 is a storage data structure on a storage device (e.g., a disk drive or other physical device for storing digital data). The storage device may be a component of the computing device on which the indexer 932 is operating (referred to herein as local storage) or may be a component of a different computing device (referred to herein as remote storage) that the indexer 938 has access to over a network. The indexer 932 can include more than one index and can include indexes of different types. For example, the indexer 932 can include event indexes, which impose minimal structure on stored data and can accommodate any type of data. As another example, the indexer 932 can include metrics indexes, which use a highly structured format to handle the higher volume and lower latency demands associated with metrics data.

The indexing module 936 organizes files in the index 938 in directories referred to as buckets. The files in a bucket 944 can include raw data files, index files, and possibly also other metadata files. As used herein, "raw data" means data as when the data was produced by the data source 902, without alteration to the format or content. As noted previously, the parsing component 934 may add fields to event data and/or perform transformations on fields in the event data, and thus a raw data file 948 can include, in addition to or instead of raw data, what is referred to herein as enriched raw data. The raw data file 948 may be compressed to reduce disk usage. An index file 946, which may also be referred to herein as a "time-series index" or tsidx file, contains metadata that the indexer 932 can use to search a corresponding raw data file 948. As noted above, the metadata in the index file 946 includes a lexicon of the event data, which associates each unique keyword in the event data in the raw data file 948 with a reference to the location of event data within the raw data file 948. The keyword data in the index file 946 may also be referred to as an inverted index. In various implementations, the data intake and query system can use index files for other purposes, such as to store data summarizations that can be used to accelerate searches.

A bucket 944 includes event data for a particular range of time. The indexing module 936 arranges buckets in the index 938 according to the age of the buckets, such that buckets for more recent ranges of time are stored in short-term storage 940 and buckets for less recent ranges of time are stored in long-term storage 942. Short-term storage 940 may be faster to access while long-term storage 942 may be slower to access. Buckets may move from short-term storage 940 to long-term storage 942 according to a configurable data retention policy, which can indicate at what point in time a bucket is old enough to be moved.

A bucket's location in short-term storage 940 or long-term storage 942 can also be indicated by the bucket's status. As an example, a bucket's status can be "hot," "warm," "cold," "frozen," or "thawed." In this example, hot bucket is one to which the indexer 932 is writing data and the bucket becomes a warm bucket when the index 932 stops writing data to it. In this example, both hot and warm buckets reside in short-term storage 940. Continuing this example, when a warm bucket is moved to long-term storage 942, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 920 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each buckets must exist within the cluster), and indexers to which buckets are copied may be selected to optimize distribution of data across the cluster.

A user can view the performance of the indexing system 920 through the monitoring console 916 provided by the user interface system 914. Using the monitoring console 916, the user can configure and monitor an index cluster, and see information such as disk usage by an index, volume usage by an indexer, index and volume size over time, data age, statistics for bucket types, and bucket settings, among other information.

Figure 10:
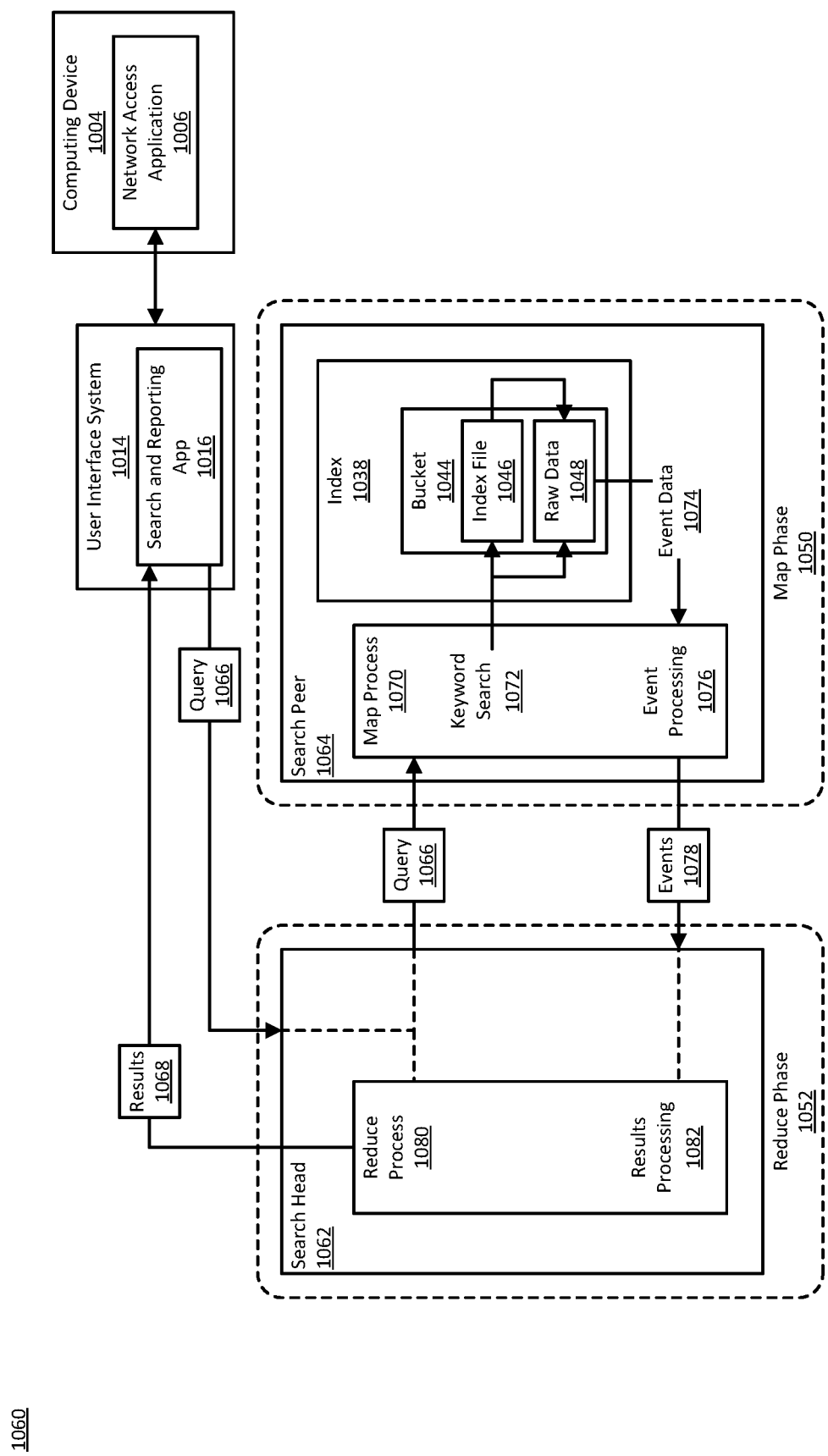
FIG. 10 is a block diagram illustrating an example computer system that may be used in some embodiments.

FIG. 10 is a block diagram illustrating in greater detail an example of the search system 1060 of a data intake and query system, such as the data intake and query system 810 of FIG. 8. The search system 1060 of FIG. 10 issues a query 1066 to a search head 1062, which sends the query 1066 to a search peer 1064. Using a map process 1070, the search peer 1064 searches the appropriate index 1038 for events identified by the query 1066 and sends events 1078 so identified back to the search head 1062. Using a reduce process 1082, the search head 1062 processes the events 1078 and produces results 1068 to respond to the query 1066. The results 1068 can provide useful insights about the data stored in the index 1038. These insights can aid in the administration of information technology systems, in security analysis of information technology systems, and/or in analysis of the development environment provided by information technology systems.

The query 1066 that initiates a search is produced by a search and reporting app 1016 that is available through the user interface system 1014 of the data intake and query system. Using a network access application 1006 executing on a computing device 1004, a user can input the query 1066 into a search field provided by the search and reporting app 1016. Alternatively or additionally, the search and reporting app 1016 can include pre-configured queries or stored queries that can be activated by the user. In some cases, the search and reporting app 1016 initiates the query 1066 when the user enters the query 1066. In these cases, the query 1066 maybe referred to as an "ad-hoc" query. In some cases, the search and reporting app 1016 initiates the query 1066 based on a schedule. For example, the search and reporting app 1016 can be configured to execute the query 1066 once per hour, once per day, at a specific time, on a specific date, or at some other time that can be specified by a date, time, and/or frequency. These types of queries maybe referred to as scheduled queries.

The query 1066 is specified using a search processing language. The search processing language includes commands that the search peer 1064 will use to identify events to return in the search results 1068. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1066 to include sequential commands, where a subsequent command may operate on the results of a prior command. As an example, sequential commands may be separated in the query 1066 by a vertical line ("|" or "pipe") symbol.

In addition to one or more search commands, the query 1066 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1066 occurs in two broad phases: a map phase 1050 and a reduce phase 1052. The map phase 1050 takes place across one or more search peers. In the map phase 1050, the search peers locate event data that matches the search terms in the search query 1066 and sorts the event data into field-value pairs. When the map phase 1050 is complete, the search peers send events that they have found to one or more search heads for the reduce phase 1052. During the reduce phase 1052, the search heads process the events through commands in the search query 1066 and aggregate the events to produce the final search results 1068.

A search head, such as the search head 1062 illustrated in FIG. 10, is a component of the search system 1060 that manages searches. The search head 1062, which may also be referred to herein as a search management component, can be implemented using program code that can be executed on a computing device. The program code for the search head 1062 can be stored on a non-transitory computer-readable medium and from this medium can be loaded or copied to the memory of a computing device. One or more hardware processors of the computing device can read the program code from the memory and execute the program code in order to implement the operations of the search head 1062.

Upon receiving the search query 1066, the search head 1062 directs the query 1066 to one or more search peers, such as the search peer 1064 illustrated in FIG. 10. "Search peer" is an alternate name for "indexer" and a search peer may be largely similar to the indexer described previously. The search peer 1064 may be referred to as a "peer node" when the search peer 1064 is part of an indexer cluster. The search peer 1064, which may also be referred to as a search execution component, can be implemented using program code that can be executed on a computing device. In some implementations, one set of program code implements both the search head 1062 and the search peer 1064 such that the search head 1062 and the search peer 1064 form one component. In some implementations, the search head 1062 is an independent piece of code that performs searching and no indexing functionality. In these implementations, the search head 1062 may be referred to as a dedicated search head.

The search head 1062 may consider multiple criteria when determining whether to send the query 1066 to the particular search peer 1064. For example, the search system 1060 may be configured to include multiple search peers that each have duplicative copies of at least some of the event data. In this example, the sending the search query 1066 to more than one search peer allows the search system 1060 to distribute the search workload across different hardware resources. As another example, search system 1060 may include different search peers for different purposes (e.g., one has an index storing a first type of data or from a first data source while a second has an index storing a second type of data or from a second data source). In this example, the search query 1066 may specify which indexes to search, and the search head 1062 will send the query 1066 to the search peers that have those indexes.

To identify events 1078 to send back to the search head 1062, the search peer 1064 performs a map process 1070 to obtain event data 1074 from the index 1038 that is maintained by the search peer 1064. During a first phase of the map process 1070, the search peer 1064 identifies buckets that have events that are described by the time indicator in the search query 1066. As noted above, a bucket contains events whose timestamps fall within a particular range of time. For each bucket 1044 whose events can be described by the time indicator, during a second phase of the map process 1070, the search peer 1064 performs a keyword search 1072 using search terms specified in the search query 1066. The search terms can be one or more of keywords, phrases, fields, Boolean expressions, and/or comparison expressions that in combination describe events being searched for. When segmentation is enabled at index time, the search peer 1064 performs the keyword search 1072 on the bucket's index file 1046. As noted previously, the index file 1046 includes a lexicon of the searchable terms in the events stored in the bucket's raw data 1048 file. The keyword search 1072 searches the lexicon for searchable terms that correspond to one or more of the search terms in the query 1066. As also noted above, the lexicon incudes, for each searchable term, a reference to each location in the raw data 1048 file where the searchable term can be found. Thus, when the keyword search identifies a searchable term in the index file 1046 that matches query 1066, the search peer 1064 can use the location references to extract from the raw data 1048 file the event data 1074 for each event that include the searchable term.

In cases where segmentation was disabled at index time, the search peer 1064 performs the keyword search 1072 directly on the raw data 1048 file. To search the raw data 1048, the search peer 1064 may identify searchable segments in events in a similar manner as when the data was indexed. Thus, depending on how the search peer 1064 is configured, the search peer 1064 may look at event fields and/or parts of event fields to determine whether an event matches the query 1066. Any matching events can be added to the event data 1074 read from the raw data 1048 file. The search peer 1064 can further be configured to enable segmentation at search time, so that searching of the index 1038 causes the search peer 1064 to build a lexicon in the index file 1046.

The event data 1074 obtained from the raw data 1048 file includes the full text of each event found by the keyword search 1072. During a third phase of the map process 1070, the search peer 1064 performs event processing 1076 on the event data 1074, with the steps performed being determined by the configuration of the search peer 1064 and/or commands in the search query 1066. For example, the search peer 1064 can be configured to perform field discovery and field extraction. Field discovery is a process by which the search peer 1064 identifies and extracts key-value pairs from the events in the event data 1074. The search peer 1064 can, for example, be configured to automatically extract the first 100 fields (or another number of fields) in the event data 1074 that can be identified as key-value pairs. As another example, the search peer 1064 can extract any fields explicitly mentioned in the search query 1066. The search peer 1064 can, alternatively or additionally, be configured with particular field extractions to perform.

Other examples of steps that can be performed during event processing 1076 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1064 sends processed events 1078 to the search head 1062, which performs a reduce process 1080. The reduce process 1080 potentially receives events from multiple search peers and performs various results processing 1082 steps on the events. The results processing 1082 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 1082 can further include applying commands from the search query 1066 to the events. The query 1066 can include, for example, commands for evaluating and/or manipulating fields (e.g., to generate new fields from existing fields or parse fields that have more than one value). As another example, the query 1066 can include commands for calculating statistics over the events, such as counts of the occurrences of fields, or sums, averages, ranges, and so on, of field values. As another example, the query 1066 can include commands for generating statistical values for purposes of generating charts of graphs of the events.

Through results processing 1082, the reduce process 1080 produces the events found by processing the search query 1066, as well as some information about the events, which the search head 1062 outputs to the search and reporting app 1016 as search results 1068. The search and reporting app 1016 can generate visual interfaces for viewing the search results 1068. The search and reporting app 1016 can, for example, output visual interfaces for the network access application 1006 running on a computing device 1004 to generate.

The visual interfaces can include various visualizations of the search results 1068, such as tables, line or area charts, Chloropleth maps, or single values. The search and reporting app 1016 can organize the visualizations into a dashboard, where the dashboard includes a panel for each visualization. A dashboard can thus include, for example, a panel listing the raw event data for the events in the search results 1068, a panel listing fields extracted at index time and/or found through field discovery along with statistics for those fields, and/or a timeline chart indicating how many events occurred at specific points in time (as indicated by the timestamps associated with each event). In various implementations, the search and reporting app 1016 can provide one or more default dashboards. Alternatively or additionally, the search and reporting app 1016 can include functionality that enables a user to configure custom dashboards.

The search and reporting app 1016 can also enable further investigation into the events in the search results 1068. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1066. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such examples may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective examples may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some examples, certain operations, acts, events, or functions of any of the algorithms described herein can be performed in a different sequence, can be added, merged, or left out altogether (e.g., not all are necessary for the practice of the algorithms). In certain examples, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:
   executing, by an information technology (IT) and security operations application, a playbook including a plurality of function blocks, wherein the plurality of function blocks collectively defines a series of operations to be performed responsive to identification of an incident in an IT environment, wherein each function block of the plurality of function blocks includes computer program source code that is executed upon encountering the function block during execution of the playbook, and wherein the plurality of function blocks includes a custom code function block that includes source code provided by a user of the IT and security operations application;
   monitoring, by the IT and security operations application, execution of each of the plurality of function blocks to obtain a plurality of playbook run statistics for the playbook, wherein the obtaining the plurality of playbook run statistics differentiates between the custom code function block and other function blocks of the plurality of function blocks at least in part by obtaining a first type of statistics for the custom code function block and a second type of statistics for the other function blocks that is different from the first type of statistics for the custom code function block; and
   causing display of a report indicating the plurality of playbook run statistics including the first type of statistics for the custom code function block that is different from the second type of statistics for the other function blocks.

2. The computer-implemented method of claim 1, wherein the plurality of playbook run statistics includes block-specific statistics for a function block of the plurality of function blocks, and wherein the block-specific statistics include at least one of: a number of database queries executed by the function block, an average latency of the database queries executed by the function block, a number of bytes transmitted via Hypertext Transfer Protocol (HTTP) requests sent by the function block, a number of bytes transmitted via HTTP requests received by the function block, an average amount of time between HTTP requests sent by the function block and corresponding HTTP requests received by the function block, a number of HTTP requests sent by the function block, a number of times the function block is executed, a number of times the function block completed successfully, or a number of times the function block failed.

3. The computer-implemented method of claim 1, wherein executing the playbook is a first run of the playbook, and wherein the method further comprises:
   executing, by the IT and security operations application, a plurality of runs of the playbook including the first run;
   obtaining playbook run statistics for each run of the plurality of runs of the playbook; and
   wherein the report includes an average of one or more of the playbook run statistics for the plurality of runs.

4. The computer-implemented method of claim 1, wherein executing the playbook is a first run of the playbook, wherein the playbook run statistics are first playbook run statistics associated with the first run of the playbook, and wherein the method further comprises:
   executing, by the IT and security operations application, a plurality of runs of the playbook;
   obtaining playbook run statistics for each run of the plurality of runs of the playbook; and
   wherein the report displays both the first playbook run statistics, and an average of one or more of the playbook run statistics for the plurality of runs of the playbook.

5. The computer-implemented method of claim 1, further comprising:
receiving input requesting to enable generation of the plurality of playbook run statistics for the playbook;
adding, by the IT and security operations application, source code to the playbook used to generate the plurality of playbook run statistics; and
wherein monitoring execution of each of the plurality of function blocks includes executing the source code used to generate the plurality of playbook run statistics.

6. The computer-implemented method of claim 1, further comprising:
receiving, via the report, selection of a function block of the plurality of function blocks; and
displaying playbook run statistics specific to the function block.

7. The computer-implemented method of claim 1, further comprising:
receiving, by the IT and security operations application, an application programming interface (API) request for the plurality of playbook run statistics, wherein the API request identifies the playbook; and
sending a response including the plurality of playbook run statistics.

8. The computer-implemented method of claim 1, further comprising:
receiving, by the IT and security operations application, an application programming interface (API) request for the plurality of playbook run statistics, wherein the API request identifies the playbook, and wherein the API request includes one or more request parameters indicating at least one of: a filter identifying a list of function blocks of the playbook, a list of playbook run identifiers associated with the playbook, or a time range of playbook executions;
generating filtered playbook run statistics based on the one or more request parameters; and
sending a response including the filtered playbook run statistics.

9. The computer-implemented method of claim 1, wherein monitoring execution of each of the plurality of function blocks to obtain a plurality of playbook run statistics for the playbook includes:
collecting, based on execution of source code included in the playbook, first playbook run statistics;
collecting, based on operation of a playbook execution engine executing the playbook, second playbook run statistics; and
storing the first playbook run statistics and the second playbook run statistics in a database.

10. The computer-implemented method of claim 1, further comprising:
executing, by a playbook execution engine, a function block of the plurality of function blocks, wherein executing the function block includes initiating interactions with a computing device or service that is external to the IT and security operations application; and
wherein playbook run statistics for the function block reflect the interactions with the computing device or service.

11. A computing device, comprising:
a processor; and
a non-transitory computer-readable medium having stored thereon instructions that, when executed by the processor, cause the processor to perform operations including:
executing, by an information technology (IT) and security operations application, a playbook including a plurality of function blocks, wherein the plurality of function blocks collectively defines a series of operations to be performed responsive to identification of an incident in an IT environment, wherein each function block of the plurality of function blocks includes computer program source code that is executed upon encountering the function block during execution of the playbook, and wherein the plurality of function blocks includes a custom code function block that includes source code provided by a user of the IT and security operations application;
monitoring, by the IT and security operations application, execution of each of the plurality of function blocks to obtain a plurality of playbook run statistics for the playbook, wherein the obtaining the plurality of playbook run statistics differentiates between the custom code function block and other function blocks of the plurality of function blocks at least in part by obtaining a first type of statistics for the custom code function block and a second type of statistics for the other function blocks that is different from the first type of statistics for the custom code function block; and
causing display of a report indicating the plurality of playbook run statistics including the first type of statistics for the custom code function block that is different from the second type of statistics for the other function blocks.

12. The computing device of claim 11, where the instructions, wherein the plurality of playbook run statistics includes block-specific statistics for a function block of the plurality of function blocks, and wherein the block-specific statistics include at least one of: a number of database queries executed by the function block, an average latency of the database queries executed by the function block, a number of bytes transmitted via Hypertext Transfer Protocol (HTTP) requests sent by the function block, a number of bytes transmitted via HTTP requests received by the function block, an average amount of time between HTTP requests sent by the function block and corresponding HTTP requests received by the function block, a number of HTTP requests sent by the function block, a number of times the function block is executed, a number of times the function block completed successfully, or a number of times the function block failed.

13. The computing device of claim 11, wherein executing the playbook is a first run of the playbook, and wherein the instructions, when executed by the processor, further cause the processor to perform operations including:
executing, by the IT and security operations application, a plurality of runs of the playbook including the first run;
obtaining playbook run statistics for each run of the plurality of runs of the playbook; and
wherein the report includes an average of one or more of the playbook run statistics for the plurality of runs.

14. The computing device of claim 11, wherein executing the playbook is a first run of the playbook, wherein the playbook run statistics are first playbook run statistics associated with the first run of the playbook, and wherein the instructions, when executed by the processor, further cause the processor to perform operations including:
executing, by the IT and security operations application, a plurality of runs of the playbook;

obtaining playbook run statistics for each run of the plurality of runs of the playbook; and wherein the report displays both the first playbook run statistics, and an average of one or more of the playbook run statistics for the plurality of runs of the playbook.

15. The computing device of claim 11, wherein the instructions, when executed by the processor, further cause the processor to perform operations including:

receiving input requesting to enable generation of the plurality of playbook run statistics for the playbook;

adding, by the IT and security operations application, source code to the playbook used to generate the plurality of playbook run statistics; and wherein monitoring execution of each of the plurality of function blocks includes executing the source code used to generate the plurality of playbook run statistics.

16. A non-transitory, computer-readable medium having stored thereon instructions that, when executed by one or more processors, cause the one or more processors to perform operations including:

executing, by an information technology (IT) and security operations application, a playbook including a plurality of function blocks, wherein the plurality of function blocks collectively defines a series of operations to be performed responsive to identification of an incident in an IT environment, wherein each function block of the plurality of function blocks includes computer program source code that is executed upon encountering the function block during execution of the playbook, and wherein the plurality of function blocks includes a custom code function block that includes source code provided by a user of the IT and security operations application;

monitoring, by the IT and security operations application, execution of each of the plurality of function blocks to obtain a plurality of playbook run statistics for the playbook, wherein the obtaining the plurality of playbook run statistics differentiates between the custom code function block and other function blocks of the plurality of function blocks at least in part by obtaining a first type of statistics for the custom code function block and a second type of statistics for the other function blocks that is different from the first type of statistics for the custom code function block; and causing display of a report indicating the plurality of playbook run statistics including the first type of statistics for the custom code function block that is different from the second type of statistics for the other function blocks.

17. The non-transitory, computer-readable medium of claim 16, wherein the plurality of playbook run statistics includes block-specific statistics for a function block of the plurality of function blocks, and wherein the block-specific statistics include at least one of: a number of database queries executed by the function block, an average latency of the database queries executed by the function block, a number of bytes transmitted via Hypertext Transfer Protocol (HTTP) requests sent by the function block, a number of bytes transmitted via HTTP requests received by the function block, an average amount of time between HTTP requests sent by the function block and corresponding HTTP requests received by the function block, a number of HTTP requests sent by the function block, a number of times the function block is executed, a number of times the function block completed successfully, or a number of times the function block failed.

18. The non-transitory, computer-readable medium of claim 16, wherein executing the playbook is a first run of the playbook, and wherein the instructions, when executed by the one or more processors, further cause the one or more processors to perform operations including:

executing, by the IT and security operations application, a plurality of runs of the playbook including the first run;

obtaining playbook run statistics for each run of the plurality of runs of the playbook; and wherein the report includes an average of one or more of the playbook run statistics for the plurality of runs.

19. The non-transitory, computer-readable medium of claim 16, wherein executing the playbook is a first run of the playbook, wherein the playbook run statistics are first playbook run statistics associated with the first run of the playbook, and wherein the instructions, when executed by the one or more processors, further cause the one or more processors to perform operations including:

executing, by the IT and security operations application, a plurality of runs of the playbook;

obtaining playbook run statistics for each run of the plurality of runs of the playbook; and wherein the report displays both the first playbook run statistics, and an average of one or more of the playbook run statistics for the plurality of runs of the playbook.

* * * * *